US012717013B2

(12) United States Patent
Peeters et al.

(10) Patent No.: US 12,717,013 B2
(45) Date of Patent: Aug. 25, 2026

(54) USING CLEANING PROTOCOLS TO MONITOR DEFECTS ASSOCIATED WITH LIGHT DETECTION AND RANGING (LIDAR) DEVICES

(71) Applicant: Waymo LLC, Mountain View, CA (US)

(72) Inventors: Lucas Peeters, Palo Alto, CA (US); Chase Salsbury, San Mateo, CA (US); Kanika Sachdev, Sunnyvale, CA (US); Luke Wachter, San Francisco, CA (US); Tadeusz Pudlik, Mountain View, CA (US); Caner Onal, Palo Alto, CA (US); Logan Su, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 888 days.

(21) Appl. No.: 18/148,619

(22) Filed: Dec. 30, 2022

(65) Prior Publication Data

US 2024/0219538 A1 Jul. 4, 2024

(51) Int. Cl.
*G01C 3/08* (2006.01)
*B08B 1/16* (2024.01)
(Continued)

(52) U.S. Cl.
CPC ............. *G01S 7/497* (2013.01); *B08B 1/165* (2024.01); *B08B 3/02* (2013.01); *B08B 5/02* (2013.01);
(Continued)

(58) Field of Classification Search
CPC . G01S 2007/4977; G01S 7/497; B08B 1/165; B08B 3/02; B08B 5/02; B08B 7/04; B08B 13/00
See application file for complete search history.

(56) References Cited

U.S. PATENT DOCUMENTS 11,007,608 B2 5/2021 Izumi
11,077,830 B2 8/2021 Kim et al.
(Continued)

FOREIGN PATENT DOCUMENTS

CN 113093209 A 7/2021
CN 114270210 A 4/2022
(Continued)

OTHER PUBLICATIONS

Goelles, Thomas, Birgit Schlager, and Stefan Muckenhuber. "Fault detection, isolation, identification and recovery (fdiir) methods for automotive perception sensors including a detailed literature survey for lidar." Sensors 20, No. 13 (2020): 3662.

*Primary Examiner* — Mark Hellner
(74) *Attorney, Agent, or Firm* — McDonnell Boehnen Hulbert & Berghoff LLP

(57) ABSTRACT

Example embodiments relate to using cleaning protocols to monitor defects associated with light detection and ranging (lidar) devices. An example embodiment includes a method. The method includes applying, using a cleaning device, a cleaning protocol to one or more optical components of a light detection and ranging (lidar) device. The method also includes emitting, from a light emitter of the lidar device, one or more light signals. Additionally, the method includes detecting, by a light detector of the lidar device, reflections of the one or more light signals. Further, the method includes determining, by a controller of the lidar device based on the detected reflections of the one or more light signals, that one or more defects are present within the one or more optical components or within the cleaning device.

20 Claims, 23 Drawing Sheets

(51) Int. Cl.

| | |
|---|---|
| ***B08B 3/02*** | (2006.01) |
| ***B08B 5/02*** | (2006.01) |
| ***B08B 7/04*** | (2006.01) |
| ***B08B 13/00*** | (2006.01) |
| ***G01S 7/497*** | (2006.01) |

(52) U.S. Cl.
CPC ................ *B08B 7/04* (2013.01); *B08B 13/00* (2013.01); *G01S 2007/4977* (2013.01)

(56) References Cited

U.S. PATENT DOCUMENTS

| | | | | |
|---|---|---|---|---|
| 11,100,616 | B2 | 8/2021 | Herman et al. | |
| 11,119,198 | B2 | 9/2021 | Campbell et al. | |
| 2018/0284268 | A1* | 10/2018 | McWhirter | G01S 7/4816 |
| 2020/0159010 | A1 | 5/2020 | Kuwae et al. | |
| 2020/0232895 | A1 | 7/2020 | Herman | |
| 2021/0263153 | A1 | 8/2021 | McWhirter et al. | |
| 2022/0221564 | A1 | 7/2022 | Werneth et al. | |
| 2022/0244397 | A1 | 8/2022 | Frederiksen et al. | |
| 2022/0268941 | A1 | 8/2022 | Wakamiya | |
| 2022/0297638 | A1 | 9/2022 | Diehl | |
| 2024/0101072 | A1* | 3/2024 | Anderson | B60S 1/52 |

FOREIGN PATENT DOCUMENTS

| | | | | |
|---|---|---|---|---|
| CN | 115390049 | A | 11/2022 | |
| EP | 2977787 | A1 | 1/2016 | |
| EP | 2972471 | B1 | 9/2019 | |
| EP | 3839622 | A1 | 6/2021 | |
| EP | 3885207 | A1 * | 9/2021 | G02B 27/0006 |
| JP | 2021011242 | A | 2/2021 | |
| JP | 2021509097 | A | 3/2021 | |
| JP | 2021079758 | A | 5/2021 | |
| WO | 2019245614 | A2 | 12/2019 | |
| WO | 2021003361 | A1 | 1/2021 | |
| WO | 2021079911 | A1 | 4/2021 | |
| WO | 2022035442 | A1 | 2/2022 | |
| WO | 2022055873 | A1 | 3/2022 | |
| WO | 2022095247 | A1 | 5/2022 | |

* cited by examiner 258C
252B
252D
254B
250
258B
254A
256
252A
252C
258A

USING CLEANING PROTOCOLS TO MONITOR DEFECTS ASSOCIATED WITH LIGHT DETECTION AND RANGING (LIDAR) DEVICES

BACKGROUND

Unless otherwise indicated herein, the description in this section is not prior art to the claims in this application and is not admitted to be prior art by inclusion in this section.

Light detection and ranging (lidar) devices may estimate distances to objects in a surrounding environment by emitting light pulses into the surrounding environment and determining a respective time of flight for each light pulse. The time of flight of each light pulse can be used to estimate distances to reflective objects in the surrounding environment and/or to create a three-dimensional point cloud indicative of reflective objects in the surrounding environment. Additionally, cameras may be used to capture images of one or more objects in a surrounding environment. Such images may be used in object detection and avoidance procedures (e.g., within a vehicle operating in an autonomous or semi-autonomous mode). However, defects along one or more optical paths of lidar devices and/or cameras can lead to erroneous detections (e.g., erroneous point clouds and blurry and/or obscured images).

SUMMARY

Example embodiments relate to techniques that involve using cleaning protocols to monitor defects associated with lidar devices. These techniques may involve using a cleaning device to apply a cleaning protocol. For example, the cleaning protocol may include spraying cleaning solution onto one or more components (e.g., one or more optical components, such as optical windows, lenses, hydrophobic coatings, or mirrors) associated with the lidar device. As the cleaning protocol progresses, such as when the cleaning solution begins to dry or is otherwise removed (e.g., by wiping the one or more optical components using a wiper of the cleaning device or by applying pressurized air onto the one or more optical components using a pressurized air supply of the cleaning device), light emitters of the lidar device may emit light signals. These light signals may be reflected (e.g., off the one or more optical components or off of one or more defects on or within the one or more optical components) and then detected by light detectors of the lidar device. By analyzing these detected light signals, a computing device (e.g., a controller of the lidar device) may determine whether one or more defects are present within the one or more optical components and/or within the cleaning device and, further, may determine one or more qualities (e.g., optical qualities and hydrophobic qualities) of the optical component based on the identified defects.

In a first aspect, a method is provided. The method includes applying, using a cleaning device of a lidar device, a cleaning protocol to one or more optical components of the lidar device. The method also includes emitting, from a light emitter of the lidar device, one or more light signals. Additionally, the method includes detecting, by a light detector of the lidar device, reflections of the one or more light signals. Further, the method includes determining, by a controller of the lidar device based on the detected reflections of the one or more light signals, that one or more defects are present within the one or more optical components or within the cleaning device.

In a second aspect, a system is provided. The system includes a lidar device. The lidar device includes one or more optical components. The lidar device also includes a light emitter configured to emit one or more light signals. Further, the lidar device includes a light detector configured to detect reflections of the one or more light signals. The system also includes a cleaning device configured to apply a cleaning protocol to the one or more optical components. Additionally, the system includes a controller configured to determine, based on the detected reflections of the one or more light signals, that one or more defects are present within the one or more optical components or within the cleaning device.

In a third aspect, a computing device is provided. The computing device is configured to receive data corresponding to reflections of one or more light signals detected by a lidar device. The one or more light signals were emitted by a light emitter of the lidar device in response to a cleaning device of the lidar device applying a cleaning protocol to one or more optical components of the lidar device. The computing device is also configured to determine, based on the received data, that one or more defects are present within the one or more optical components or within the cleaning device.

These as well as other aspects, advantages, and alternatives will become apparent to those of ordinary skill in the art by reading the following detailed description, with reference, where appropriate, to the accompanying drawings.

DETAILED DESCRIPTION

Figure 1:
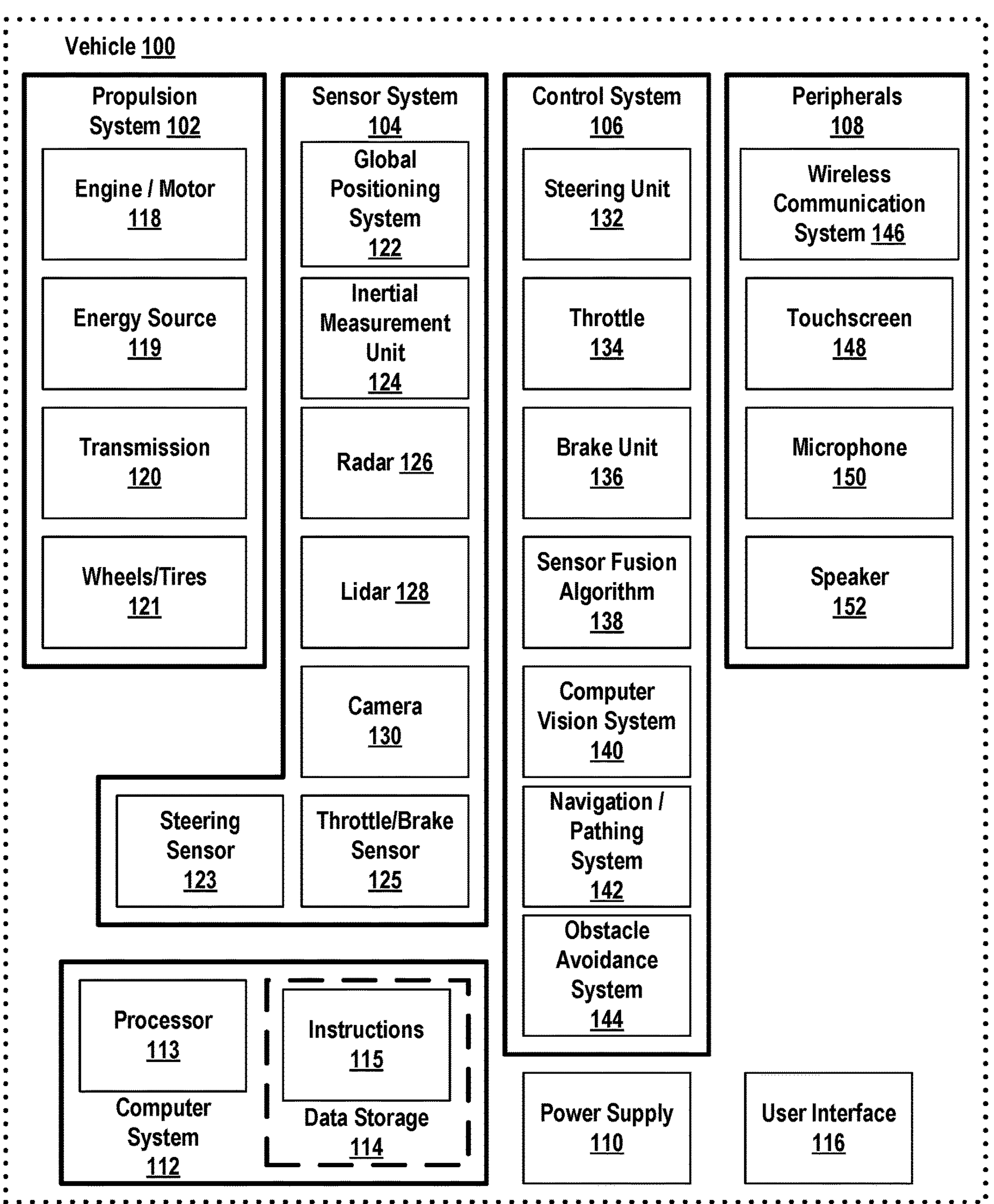
FIG. 1 is a functional block diagram illustrating a vehicle, according to example embodiments.

Example methods and systems are contemplated herein. Any example embodiment or feature described herein is not necessarily to be construed as preferred or advantageous over other embodiments or features. Further, the example embodiments described herein are not meant to be limiting. It will be readily understood that certain aspects of the disclosed systems and methods can be arranged and combined in a wide variety of different configurations, all of which are contemplated herein. In addition, the particular arrangements shown in the figures should not be viewed as limiting. It should be understood that other embodiments might include more or less of each element shown in a given figure. Additionally, some of the illustrated elements may be combined or omitted. Yet further, an example embodiment may include elements that are not illustrated in the figures.

Lidar devices as described herein can include one or more light emitters and one or more detectors used for detecting light that is emitted by the one or more light emitters and reflected by one or more objects in an environment surrounding the lidar device. As an example, the surrounding environment could include an interior or exterior environment, such as an inside of a building or an outside of a building. Additionally or alternatively, the surrounding environment could include an interior of a vehicle. Still further, the surrounding environment could include a vicinity around and/or on a roadway. Examples of objects in the surrounding environment include, but are not limited to, other vehicles, traffic signs, pedestrians, bicyclists, roadway surfaces, buildings, and terrain. Additionally, the one or more light emitters could emit light into a local environment of the lidar itself. For example, light emitted from the one or more light emitters could interact with a housing of the lidar and/or surfaces or structures coupled to the lidar. In some cases, the lidar could be mounted to a vehicle, in which case the one or more light emitters could be configured to emit light that interacts with objects within a vicinity of the vehicle. Further, the light emitters could include optical fiber amplifiers, laser diodes, light-emitting diodes (LEDs), among other possibilities.

Lidar devices and/or cameras may be used to sense a surrounding environment. For example, a lidar device may be used to generate a point cloud associated with an environment surrounding an autonomous vehicle, and that point cloud may be used by the autonomous vehicle for object detection and avoidance. Such lidar devices and/or cameras may include one or more optical components. For example, a lidar device and/or a camera may include an optical window, a mirror, a lens, etc.

Sometimes, captured images/generated point clouds can be adversely affected as a result of one or more defects on or in optical components within a camera or a lidar device (e.g., as a result of aperture fouling and/or aperture deterioration over time). For example, a scratch, a crack, a smudge, a deformation, an air bubble, an impurity, a degradation, a discoloration, an imperfect transparency, a warping, condensation, dirt, dust, mud, leaves, rain, snow, sleet, hail, ice, etc. may cause light emitted by the light emitters of the lidar to be directed to unintended/improper regions of an image sensor/light detector, may prevent light emitted by the light emitters of the lidar from ever reaching an image sensor/light detector, may result in undesirable crosstalk or internal reflections, or may otherwise modify light emitted by the light emitters of the lidar (e.g., modify polarization or wavelength) prior to the light reaching an image sensor/light detector. Such defects can result in improper object identification/distance detection. In autonomous vehicle applications, improper object identification/distance detection can result in transportation slowdowns or even collisions. As such, many lidar devices/cameras (e.g., lidar devices/cameras onboard an autonomous vehicle) may also include cleaning devices (e.g., wipers, cleaning nozzles/sprayers, and air compressors configured to apply pressurized air) that can be used to clean components of the lidar devices/cameras. For example, a lidar device may include a cleaning sprayer used to deposit a cleaning solution on an external window of the lidar device and/or a wiper used to remove the cleaning solution from the external window after it has been deposited.

Example embodiments described herein provide techniques for identifying the presence of one or more defects. Further, example embodiments allow for the detection of debris without additional detection components (e.g., additional optics, emitters, and sensors). For example, in order to detect the presence of debris (e.g., condensation, snow, and rain) on and/or monitor the state of one or more components (e.g., the state of degradation of a hydrophobic coating on a surface on an exterior window) over time, one or more cleaning components may be used to apply moisture to the one or more components. For instance, a sprayer may be used to apply water or a cleaning solution to a hydrophobic coating of a surface of an exterior window. Thereafter, light signals (e.g., crossfeedback signals, crosstalk signals, and signals that interact with objects outside of the lidar device) reflected from the water/cleaning solution and/or internal components of the lidar device may be analyzed to determine the health (e.g., amount of degradation) of the hydrophobic coating. For example, one or more light signals emitted by a light emitter, reflected (or partially reflected) from the water/cleaning solution, and then detected by a light detector may be compared to a calibration measurement (e.g., made when the lidar device was on the manufacturing line or being assembled) to determine the present state of the hydrophobic coating (e.g., how well droplets bead on the surface of the hydrophobic coating and/or how rapidly droplets are shed from the hydrophobic coating). In some embodiments, the detection of the light signals may occur while one or more additional cleaning techniques are performed (e.g., while one or more applications of pressurized air, i.e., "air puffs," are occurring).

Analyzing the reflected light signals may include monitoring the intensity of reflected light signals over time. For example, upon spraying a cleaning solution onto an optical window of the lidar device, light signals emitted toward the optical window may be substantially reflected back toward the detectors of the lidar device. This may result in relatively high-intensity detected light signals with short transit times (e.g., based on reflections from the droplets of cleaning solution on the window). Conversely, as the cleaning solution evaporates from/is moved off of (e.g., due to the application of pressurized air by the cleaning device) the optical window, the intensity of the light signals that are detected within short time windows (e.g., corresponding to short transit times) may decrease (e.g., as fewer droplets of cleaning solution are present on the optical window). Such a decrease may be observed in data corresponding to all the light detectors of the lidar device or only a subset of light detectors, in various embodiments. Regardless, though, by monitoring this decrease over time (e.g., by plotting the detected reflected intensity with respect to time), a trend can be observed. This trend can be fitted to one or more curves/functions. For example, a controller of the lidar device may fit the trend to an exponential decay function. Such a fitted exponential decay function may possess one or more figures of merit. For example, an initial value/peak value and a time constant associated with the exponential decay may be used as figures of merit. These figures of merit can be tracked over time and/or compared to one or more calibration measurements to determine the state of the lidar device (e.g., the health of the optical window, and the health of the cleaning device itself). For example, if the initial value of the exponential decay function is too low compared with calibration measurements, it may be an indication that a sprayer of the cleaning device is not providing sufficient liquid to the surface of the optical component (e.g., that the cleaning solution in the cleaning device needs to be refilled). Alternatively, if the time constant is too high compared with calibration measurements, it may be an indication that an associated hydrophobic coating has been degraded (e.g., resulting in decreased hydrophobicity). Other types of fitted functions and/or other figures of merit are also possible and are contemplated herein.

In some embodiments, the analysis of the detected signals (e.g., the comparison to the calibration measurement) may take additional factors into account when determining the state of the hydrophobic coating. For example, if the sprayer applies water/a cleaning solution to the hydrophobic coating, but it is additionally raining/snowing in the surrounding environment (e.g., as determined by an auxiliary sensor, such as a radar device), the series of detected light signals may be artificially modified to simulate a series of signals where there was no rain/snow present (e.g., an offset may be applied to the intensity of the series of detected light signals), and then that simulated series of signals may be compared to the calibration measurement.

Alternatively, there may be a bank of calibration measurements made in various environmental conditions against which runtime measurements can be compared (e.g., based on the environmental conditions when the runtime measurement was made) in order to determine the state of the hydrophobic coating.

In order to monitor the status/health of the components of the lidar device, such cleaning techniques may be performed (and the corresponding light signals analyzed) at regular intervals. For example, once a month, once a week, once a day, once an hour, once every fifteen minutes, once a minute, etc. the lidar device may perform a cleaning protocol and a study of the characteristics of the reflected light signal(s) may be carried out. Additionally or alternatively, the cleaning techniques may be performed (and the corresponding light signals analyzed) in response to a trigger event. For example, a user (e.g., a rider in an autonomous vehicle) may transmit one or more signals to the lidar device (e.g., via a user interface in the vehicle or using a mobile application on a mobile device) to request a cleaning or to indicate that a component reliability analysis should be performed. Upon receiving such a signal, the lidar device may initiate a cleaning protocol. Other trigger events are also possible and contemplated herein (e.g., weather events; communications from an offboard computing device such as a fleet management device; a determination by a controller of the lidar device that one or more objects detected in the surrounding environment were improperly identified; and a determination made by the lidar controller that one or more detected light signals, such as a detected crossfeedback signal or a detected crosstalk signal, exceed a given intensity threshold).

Additionally, upon determining that one or more defects are present within one or more components associated with the lidar device (e.g., a degradation of one or more optical components, one or more imperfections present in one or more optical components, and debris on one or more optical components) using the techniques described herein, appropriate remedial action may be initiated. For example, an additional cleaning protocol may be performed (e.g., an escalated cleaning protocol may be performed, such as a longer cleaning protocol or a cleaning protocol using a higher concentration solution or enhanced pressurized airflow). Alternatively, the one or more optical components associated with the one or more defects may be repaired or replaced. In still other embodiments, data captured via the one or more optical components associated with the one or more defects may be flagged for possible review and/or flagged as potentially unreliable. In yet other embodiments, post-processing may be performed on the data captured via the one or more optical components to account for the effects of the defects present within the one or more optical components. For example, if the defects result in a decreased apparent range to objects in the surrounding environment, an offset to range may be applied to correct the data. Likewise, if the defects result in a decreased apparent intensity of light signals reflected by objects in the surrounding environment, an offset to intensity may be applied to correct the data.

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. Additionally, an example system may also be implemented in or take the form of various vehicles, such as cars, trucks (e.g., pickup trucks, vans, tractors, and tractor trailers), motorcycles, buses, airplanes, helicopters, drones, lawn mowers, earth movers, boats, submarines, all-terrain vehicles, snowmobiles, aircraft, recreational vehicles, amusement park vehicles, farm equipment or vehicles, construction equipment or vehicles, warehouse equipment or vehicles, factory equipment or vehicles, trams, golf carts, trains, trolleys, sidewalk delivery vehicles, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. Additionally, example vehicle 100 may operate in a partially autonomous (i.e., semi-autonomous) mode in which some functions of the vehicle 100 are controlled by a human driver of the vehicle 100 and some functions of the vehicle 100 are controlled by the computing system. For example, vehicle 100 may also include subsystems that enable the driver to control operations of vehicle 100 such as steering, acceleration, and braking, while the computing system performs assistive functions such as lane-departure warnings/lane-keeping assist or adaptive cruise control based on other objects (e.g., vehicles) in the surrounding environment.

As described herein, in a partially autonomous driving mode, even though the vehicle assists with one or more driving operations (e.g., steering, braking and/or accelerating to perform lane centering, adaptive cruise control, advanced driver assistance systems (ADAS), and emergency braking), the human driver is expected to be situationally aware of the vehicle's surroundings and supervise the assisted driving operations. Here, even though the vehicle may perform all driving tasks in certain situations, the human driver is expected to be responsible for taking control as needed.

Although, for brevity and conciseness, various systems and methods are described below in conjunction with autonomous vehicles, these or similar systems and methods can be used in various driver assistance systems that do not rise to the level of fully autonomous driving systems (i.e. partially autonomous driving systems). In the United States, the Society of Automotive Engineers (SAE) has defined different levels of automated driving operations to indicate how much, or how little, a vehicle controls the driving, although different organizations, in the United States or in other countries, may categorize the levels differently. More specifically, the disclosed systems and methods can be used in SAE Level 2 driver assistance systems that implement steering, braking, acceleration, lane centering, adaptive cruise control, etc., as well as other driver support. The disclosed systems and methods can be used in SAE Level 3 driving assistance systems capable of autonomous driving under limited (e.g., highway) conditions. Likewise, the disclosed systems and methods can be used in vehicles that use SAE Level 4 self-driving systems that operate autonomously under most regular driving situations and require only occasional attention of the human operator. In all such systems, accurate lane estimation can be performed automatically without a driver input or control (e.g., while the vehicle is in motion) and result in improved reliability of vehicle positioning and navigation and the overall safety of autonomous, semi-autonomous, and other driver assistance systems. As previously noted, in addition to the way in which SAE categorizes levels of automated driving operations, other organizations, in the United States or in other countries, may categorize levels of automated driving operations differently. Without limitation, the disclosed systems and methods herein can be used in driving assistance systems defined by these other organizations' levels of automated driving operations.

As shown in FIG. 1, vehicle 100 may include various subsystems, such as propulsion system 102, sensor system 104, control system 106, one or more peripherals 108, power supply 110, computer system 112 (which could also be referred to as a computing system) with data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar 126, lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, and brake wear).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the surrounding environment of vehicle 100. As such, radar 126 may include antennas configured to transmit and receive radio signals. In some embodiments, radar 126 may correspond to a mountable radar configured to obtain measurements of the surrounding environment of vehicle 100.

Lidar 128 may include one or more laser sources, a laser scanner, and one or more detectors, among other system components, and may operate in a coherent mode (e.g., using heterodyne detection) or in an incoherent detection mode (i.e., time-of-flight mode). In some embodiments, the one or more detectors of the lidar 128 may include one or more photodetectors, which may be especially sensitive detectors (e.g., avalanche photodiodes). In some examples, such photodetectors may be capable of detecting single photons (e.g., single-photon avalanche diodes (SPADs)). Further, such photodetectors can be arranged (e.g., through an electrical connection in series) into an array (e.g., as in a silicon photomultiplier (SiPM)). In some examples, the one or more photodetectors are Geiger-mode operated devices and the lidar includes subcomponents designed for such Geiger-mode operation.

Camera 130 may include one or more devices (e.g., still camera, video camera, a thermal imaging camera, a stereo camera, and a night vision camera) configured to capture images of the surrounding environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve and a carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software (e.g., a general purpose processor such as a central processing unit (CPU), a specialized processor such as a graphical processing unit (GPU) or a tensor processing unit (TPU), an application-specific integrated circuit (ASIC), a field programmable gate array (FPGA), a volatile memory, a non-volatile memory, or one or more machine-learned models) operable to process and analyze images in an effort to determine objects that are in motion (e.g., other vehicles, pedestrians, bicyclists, or animals) and objects that are not in motion (e.g., traffic lights, roadway boundaries, speedbumps, or potholes). As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, interior microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, or control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of a surrounding environment of vehicle 100 operating in an autonomous or semi-autonomous mode. The state of the surrounding environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar 126 and/or lidar 128, and/or some other environmental mapping, ranging, and/or positioning sensor system may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E show an example vehicle 200 (e.g., a fully autonomous vehicle or semi-autonomous vehicle) that can include some or all of the functions described in connection with vehicle 100 in reference to FIG. 1. Although vehicle 200 is illustrated in FIGS. 2A-2E as a van with side view mirrors for illustrative purposes, the present disclosure is not so limited. For instance, the vehicle 200 can represent a truck, a car, a semi-trailer truck, a motorcycle, a golf cart, an off-road vehicle, a farm vehicle, or any other vehicle that is described elsewhere herein (e.g., buses, boats, airplanes, helicopters, drones, lawn mowers, earth movers, submarines, all-terrain vehicles, snowmobiles, aircraft, recreational vehicles, amusement park vehicles, farm equipment, construction equipment or vehicles, warehouse equipment or vehicles, factory equipment or vehicles, trams, trains, trolleys, sidewalk delivery vehicles, and robot devices).

The example vehicle 200 may include one or more sensor systems 202, 204, 206, 208, 210, 212, 214, and 218. In some embodiments, sensor systems 202, 204, 206, 208, 210, 212, 214, and/or 218 could represent one or more optical systems (e.g. cameras), one or more lidars, one or more radars, one or more inertial sensors, one or more humidity sensors, one or more acoustic sensors (e.g., microphones and sonar devices), or one or more other sensors configured to sense information about an environment surrounding the vehicle 200. In other words, any sensor system now known or later created could be coupled to the vehicle 200 and/or could be utilized in conjunction with various operations of the vehicle 200. As an example, a lidar could be utilized in self-driving or other types of navigation, planning, perception, and/or mapping operations of the vehicle 200. In addition, sensor systems 202, 204, 206, 208, 210, 212, 214, and/or 218 could represent a combination of sensors described herein (e.g., one or more lidars and radars; one or more lidars and cameras; one or more cameras and radars; or one or more lidars, cameras, and radars).

Note that the number, location, and type of sensor systems (e.g., 202 and 204) depicted in FIGS. 2A-E are intended as a non-limiting example of the location, number, and type of such sensor systems of an autonomous or semi-autonomous vehicle. Alternative numbers, locations, types, and configurations of such sensors are possible (e.g., to comport with vehicle size, shape, aerodynamics, fuel economy, aesthetics, or other conditions, to reduce cost, or to adapt to specialized environmental or application circumstances). For example, the sensor systems (e.g., 202 and 204) could be disposed in various other locations on the vehicle (e.g., at location 216) and could have fields of view that correspond to internal and/or surrounding environments of the vehicle 200.

The sensor system 202 may be mounted atop the vehicle 200 and may include one or more sensors configured to detect information about an environment surrounding the vehicle 200, and output indications of the information. For example, sensor system 202 can include any combination of cameras, radars, lidars, inertial sensors, humidity sensors, and acoustic sensors (e.g., microphones and sonar devices). The sensor system 202 can include one or more movable mounts that could be operable to adjust the orientation of one or more sensors in the sensor system 202. In one embodiment, the movable mount could include a rotating platform that could scan sensors so as to obtain information from each direction around the vehicle 200. In another embodiment, the movable mount of the sensor system 202 could be movable in a scanning fashion within a particular range of angles and/or azimuths and/or elevations. The sensor system 202 could be mounted atop the roof of a car, although other mounting locations are possible.

Additionally, the sensors of sensor system 202 could be distributed in different locations and need not be collocated in a single location. Furthermore, each sensor of sensor system 202 can be configured to be moved or scanned independently of other sensors of sensor system 202. Additionally or alternatively, multiple sensors may be mounted at one or more of the sensor locations 202, 204, 206, 208, 210, 212, 214, and/or 218. For example, there may be two lidar devices mounted at a sensor location and/or there may be one lidar device and one radar mounted at a sensor location.

The one or more sensor systems 202, 204, 206, 208, 210, 212, 214, and/or 218 could include one or more lidar sensors. For example, the lidar sensors could include a plurality of light-emitter devices arranged over a range of angles with respect to a given plane (e.g., the x-y plane). For example, one or more of the sensor systems 202, 204, 206, 208, 210, 212, 214, and/or 218 may be configured to rotate or pivot about an axis (e.g., the z-axis) perpendicular to the given plane so as to illuminate an environment surrounding the vehicle 200 with light pulses. Based on detecting various aspects of reflected light pulses (e.g., the elapsed time of flight, polarization, and intensity), information about the surrounding environment may be determined.

In an example embodiment, sensor systems 202, 204, 206, 208, 210, 212, 214, and/or 218 may be configured to provide respective point cloud information that may relate to physical objects within the surrounding environment of the vehicle 200. While vehicle 200 and sensor systems 202, 204, 206, 208, 210, 212, 214, and 218 are illustrated as including certain features, it will be understood that other types of sensor systems are contemplated within the scope of the present disclosure. Further, the example vehicle 200 can include any of the components described in connection with vehicle 100 of FIG. 1.

In an example configuration, one or more radars can be located on vehicle 200. Similar to radar 126 described above, the one or more radars may include antennas configured to transmit and receive radio waves (e.g., electromagnetic waves having frequencies between 30 Hz and 300 GHz). Such radio waves may be used to determine the distance to and/or velocity of one or more objects in the surrounding environment of the vehicle 200. For example, one or more sensor systems 202, 204, 206, 208, 210, 212, 214, and/or 218 could include one or more radars. In some examples, one or more radars can be located near the rear of the vehicle 200 (e.g., sensor systems 208 and 210), to actively scan the environment near the back of the vehicle 200 for the presence of radio-reflective objects. Similarly, one or more radars can be located near the front of the vehicle 200 (e.g., sensor systems 212 or 214) to actively scan the environment near the front of the vehicle 200. A radar can be situated, for example, in a location suitable to illuminate a region including a forward-moving path of the vehicle 200 without occlusion by other features of the vehicle 200. For example, a radar can be embedded in and/or mounted in or near the front bumper, front headlights, cowl, and/or hood, etc. Furthermore, one or more additional radars can be located to actively scan the side and/or rear of the vehicle 200 for the presence of radio-reflective objects, such as by including such devices in or near the rear bumper, side panels, rocker panels, and/or undercarriage, etc.

The vehicle 200 can include one or more cameras. For example, the one or more sensor systems 202, 204, 206, 208, 210, 212, 214, and/or 218 could include one or more cameras. The camera can be a photosensitive instrument, such as a still camera, a video camera, a thermal imaging camera, a stereo camera, a night vision camera, etc., that is configured to capture a plurality of images of the surrounding environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the surrounding environment. To this end, the camera may use one or more range detecting techniques. For example, the camera can provide range information by using a structured light technique in which the vehicle 200 illuminates an object in the surrounding environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of the camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may also include one or more acoustic sensors (e.g., one or more of the sensor systems 202, 204, 206, 208, 210, 212, 214, 216, 218 may include one or more acoustic sensors) used to sense a surrounding environment of vehicle 200. Acoustic sensors may include microphones (e.g., piezoelectric microphones, condenser microphones, ribbon microphones, or microelectromechanical systems (MEMS) microphones) used to sense acoustic waves (i.e., pressure differentials) in a fluid (e.g., air) of the environment surrounding the vehicle 200. Such acoustic sensors may be used to identify sounds in the surrounding environment (e.g., sirens, human speech, animal sounds, or alarms) upon which control strategy for vehicle 200 may be based. For example, if the acoustic sensor detects a siren (e.g., an ambulatory siren or a fire engine siren), vehicle 200 may slow down and/or navigate to the edge of a roadway.

Although not shown in FIGS. 2A-2E, the vehicle 200 can include a wireless communication system (e.g., similar to the wireless communication system 146 of FIG. 1 and/or in addition to the wireless communication system 146 of FIG. 1). The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions. For example, a route taken by a vehicle from one destination to another may be modified based on driving conditions. Additionally or alternatively, the velocity, acceleration, turn angle, follow distance (i.e., distance to a vehicle ahead of the present vehicle), lane selection, etc. could all be modified in response to changes in the driving conditions.

Figure 2A:
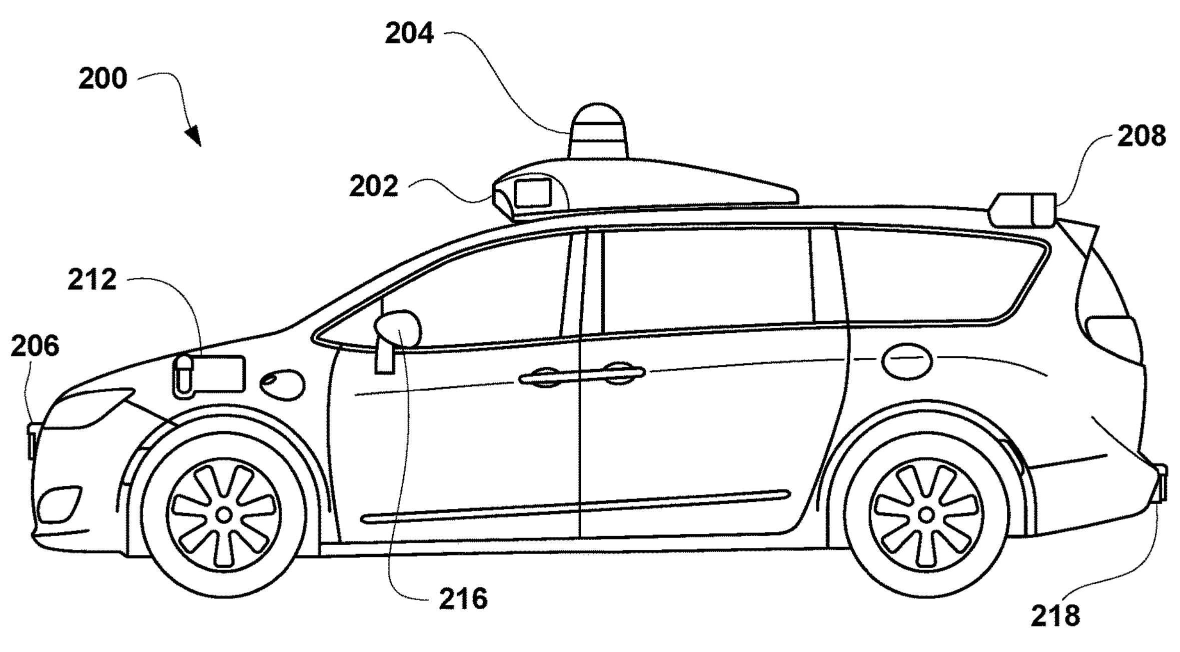
FIG. 2A is an illustration of a physical configuration of a vehicle, according to example embodiments.
Figure 2B:
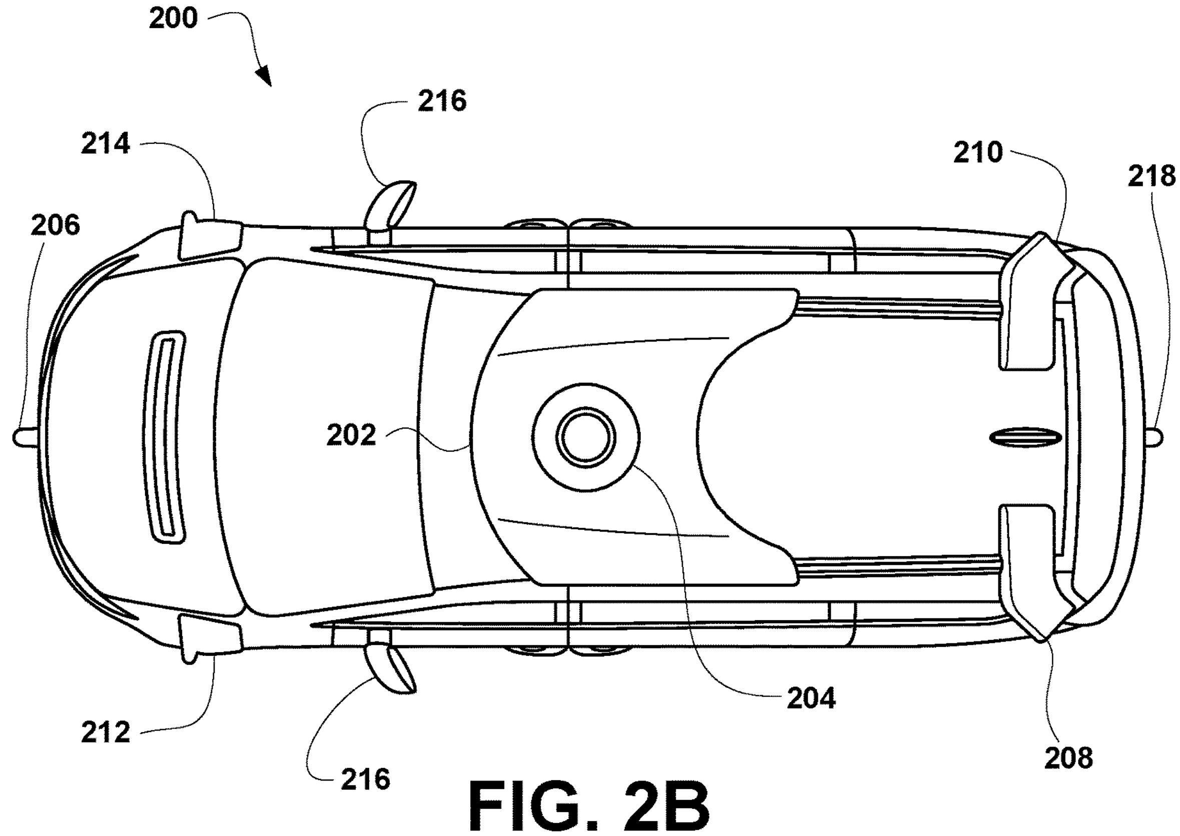
FIG. 2B is an illustration of a physical configuration of a vehicle, according to example embodiments.
Figure 2C:
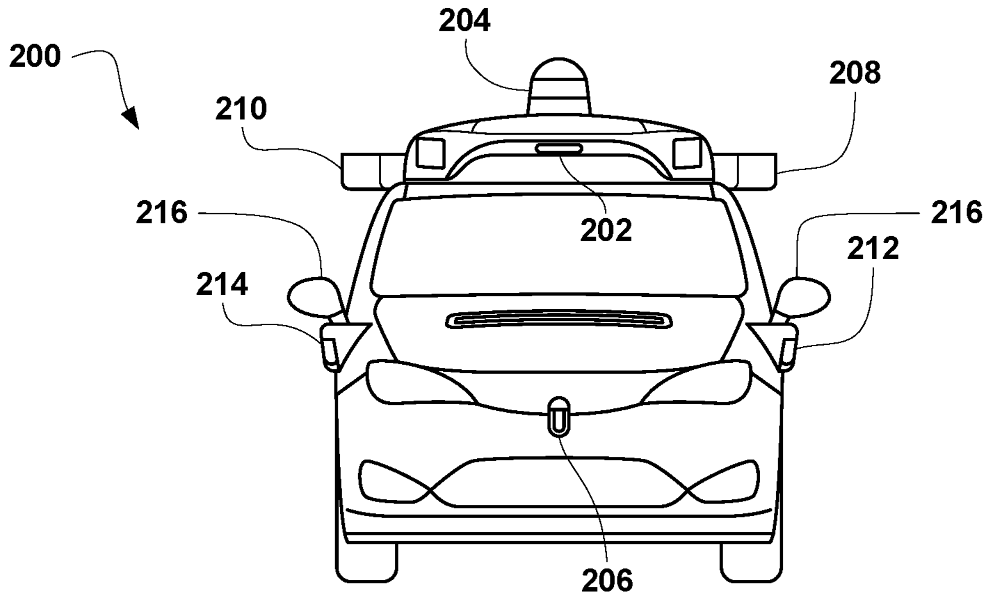
FIG. 2C is an illustration of a physical configuration of a vehicle, according to example embodiments.
Figure 2D:
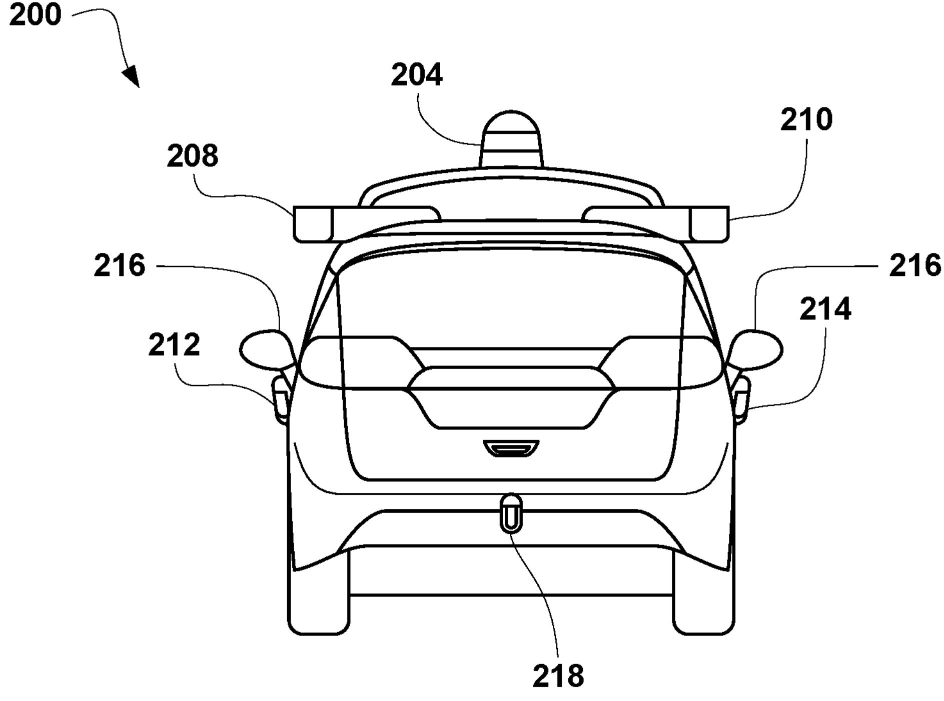
FIG. 2D is an illustration of a physical configuration of a vehicle, according to example embodiments.
Figure 2E:
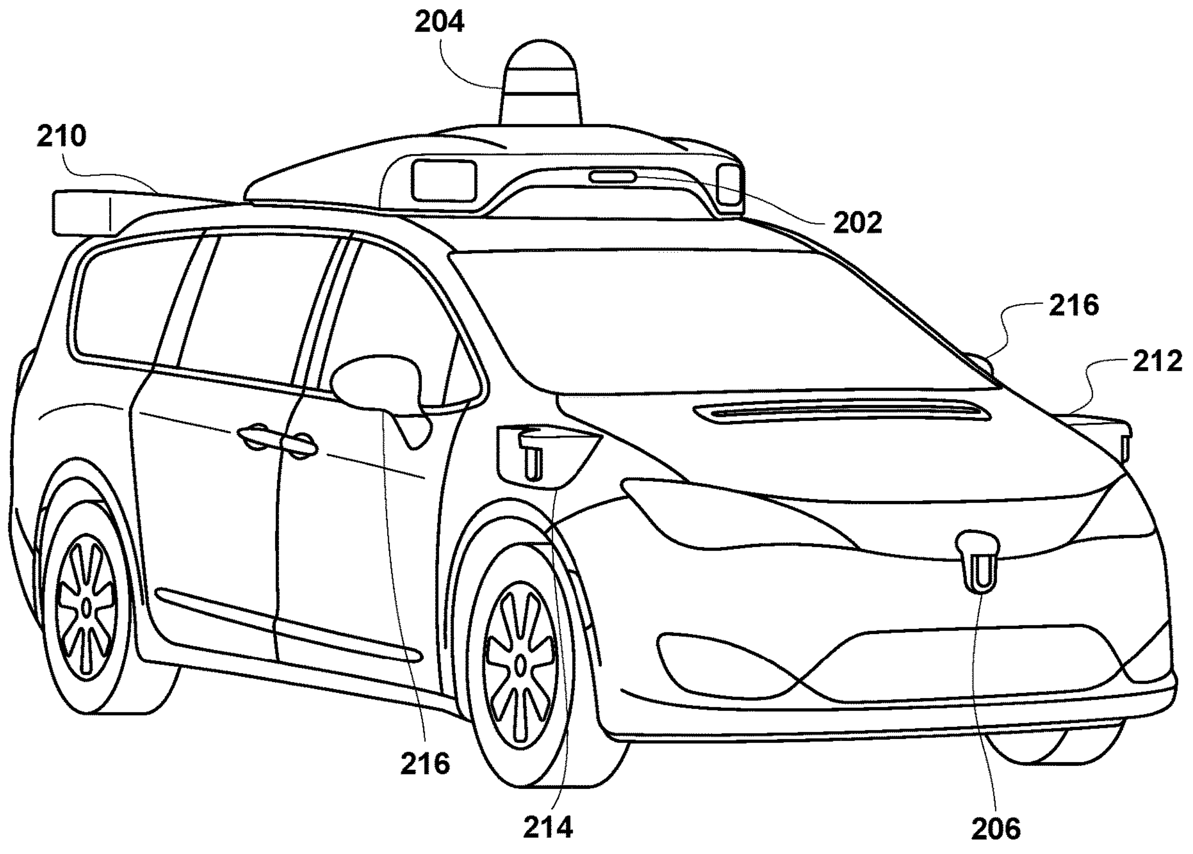
FIG. 2E is an illustration of a physical configuration of a vehicle, according to example embodiments.
Figure 2F:
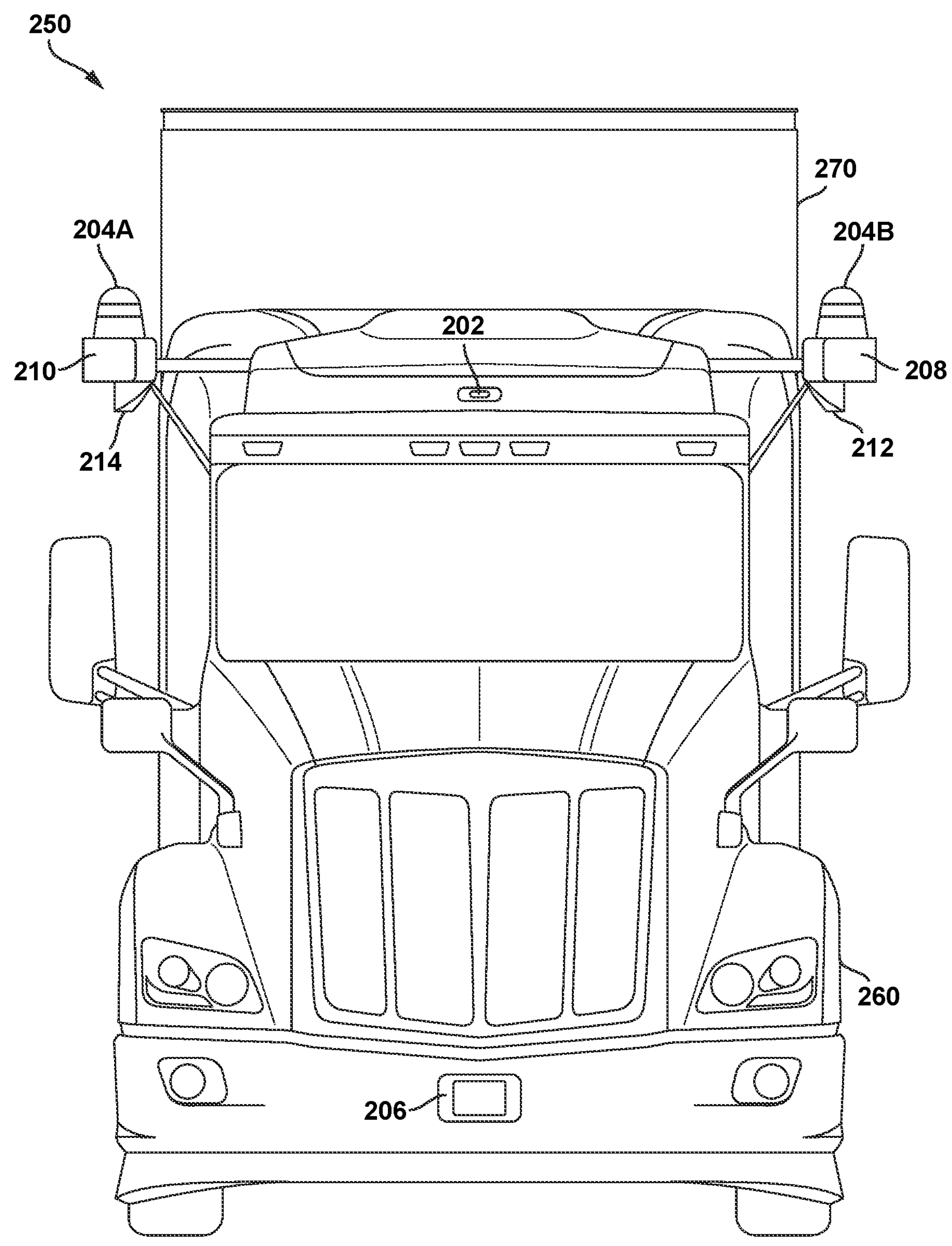
FIG. 2F is an illustration of a physical configuration of a vehicle, according to example embodiments.
Figure 2G:
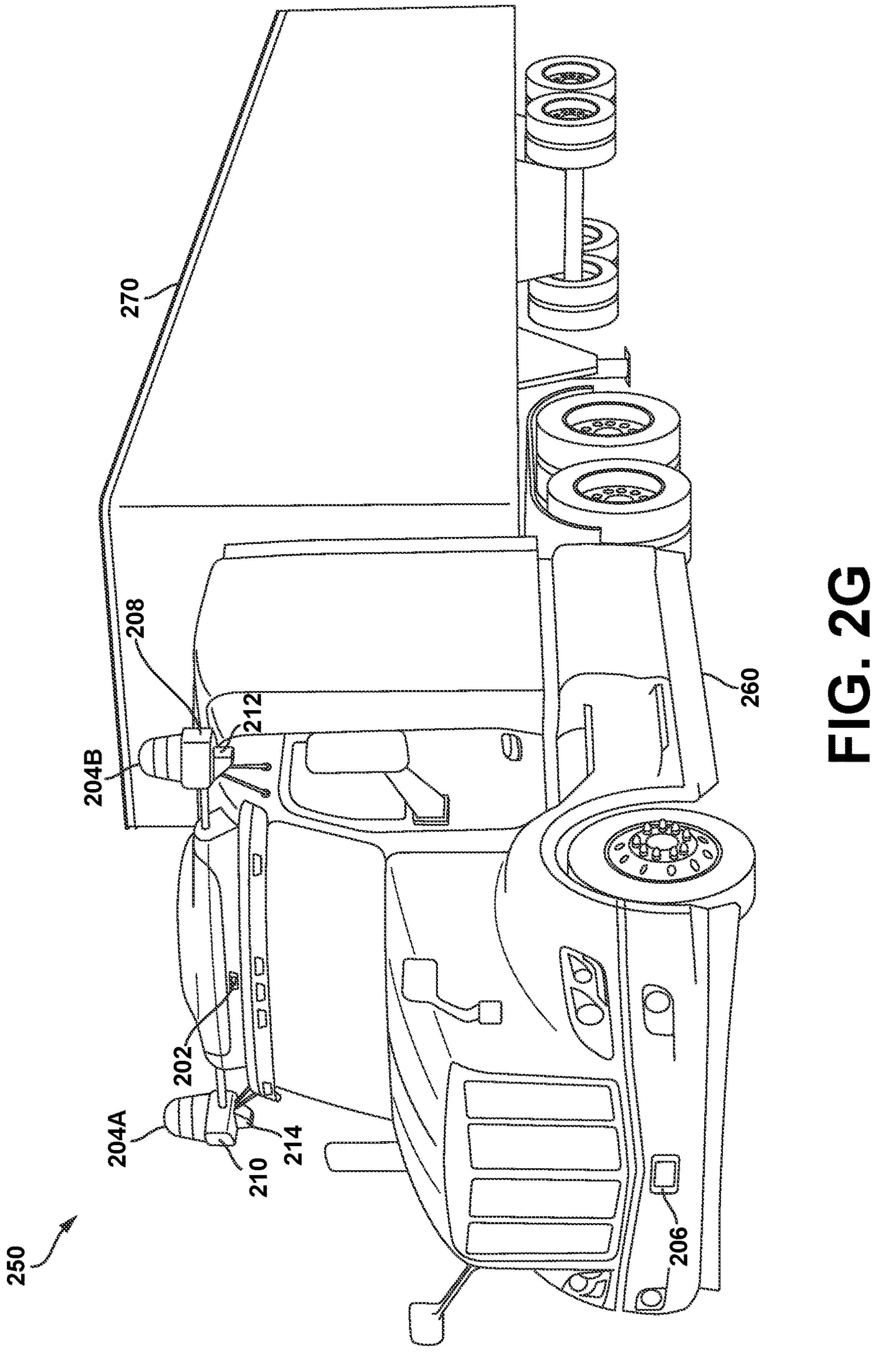
FIG. 2G is an illustration of a physical configuration of a vehicle, according to example embodiments.
Figure 2H:
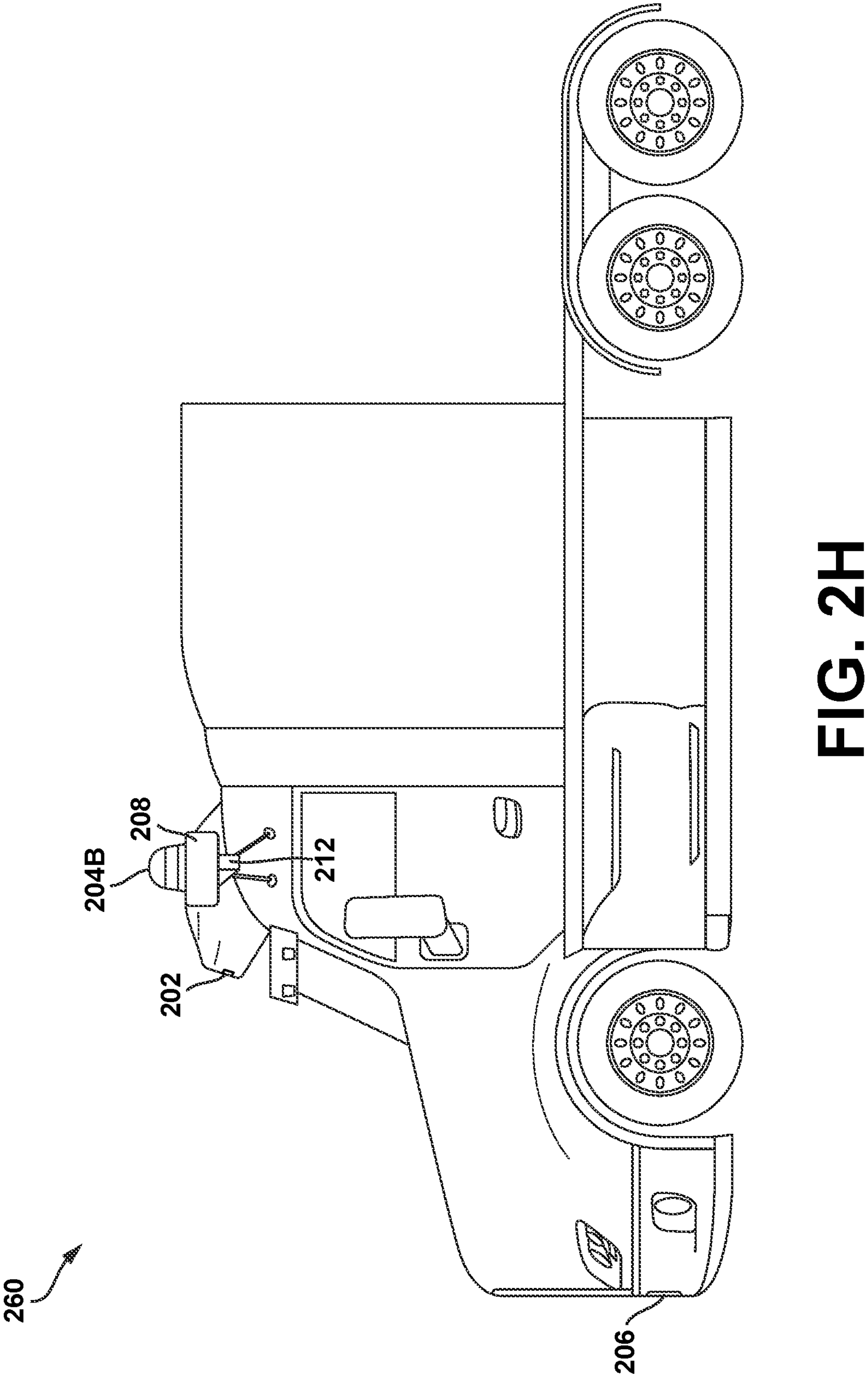
FIG. 2H is an illustration of a physical configuration of a vehicle, according to example embodiments.
Figure 2I:
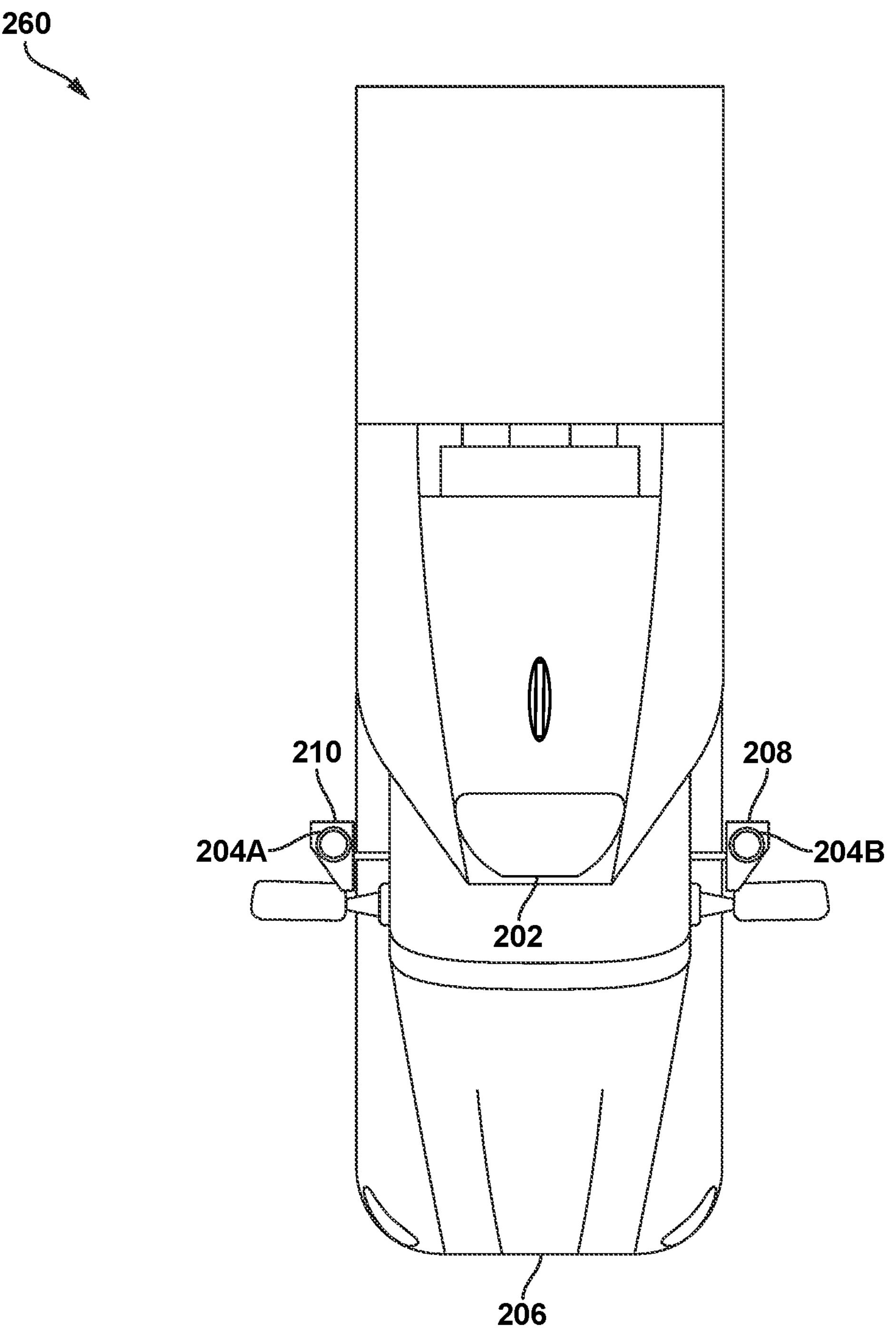
FIG. 2I is an illustration of a physical configuration of a vehicle, according to example embodiments.

As described above, in some embodiments, the vehicle 200 may take the form of a van, but alternate forms are also possible and are contemplated herein. As such, FIGS. 2F-2I illustrate embodiments where a vehicle 250 takes the form of a semi-truck. For example, FIG. 2F illustrates a front-view of the vehicle 250 and FIG. 2G illustrates an isometric view of the vehicle 250. In embodiments where the vehicle 250 is a semi-truck, the vehicle 250 may include a tractor portion 260 and a trailer portion 270 (illustrated in FIG. 2G). FIGS. 2H and 2I provide a side view and a top view, respectively, of the tractor portion 260. Similar to the vehicle 200 illustrated above, the vehicle 250 illustrated in FIGS. 2F-2I may also include a variety of sensor systems (e.g., similar to the sensor systems 202, 206, 208, 210, 212, 214 shown and described with reference to FIGS. 2A-2E). In some embodiments, whereas the vehicle 200 of FIGS. 2A-2E may only include a single copy of some sensor systems (e.g., the sensor system 204), the vehicle 250 illustrated in FIGS. 2F-2I may include multiple copies of that sensor system (e.g., the sensor systems 204A and 204B, as illustrated).

While drawings and description throughout may reference a given form of vehicle (e.g., the semi-truck vehicle 250 or the van vehicle 200), it is understood that embodiments described herein can be equally applied in a variety of vehicle contexts (e.g., with modifications employed to account for a form factor of vehicle). For example, sensors and/or other components described or illustrated as being part of the van vehicle 200 could also be used (e.g., for navigation and/or obstacle detection and avoidance) in the semi-truck vehicle 250

Figure 2J:
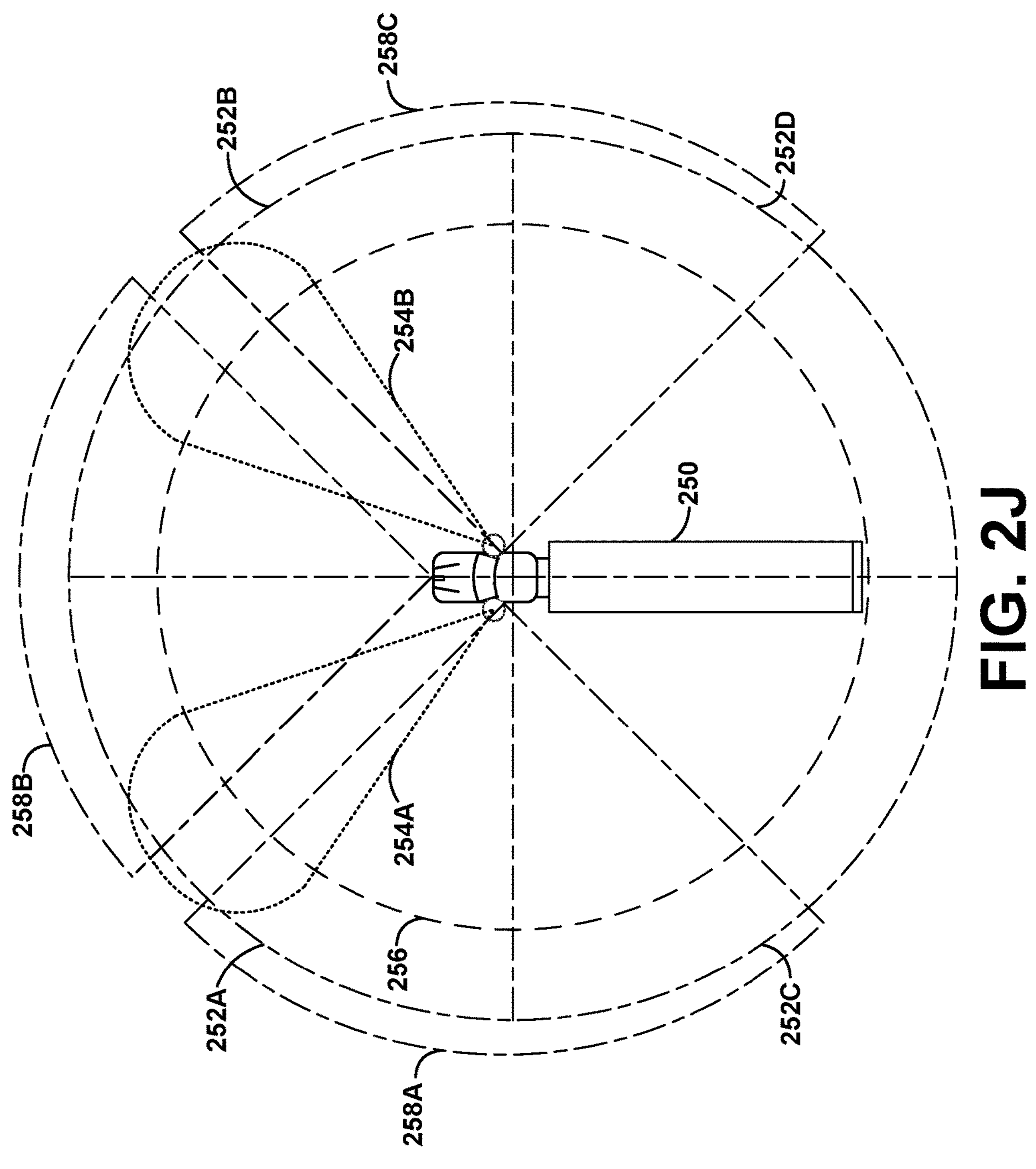
FIG. 2J is an illustration of a field of view for various sensors, according to example embodiments.

FIG. 2J illustrates various sensor fields of view (e.g., associated with the vehicle 250 described above). As described above, vehicle 250 may contain a plurality of sensors/sensor units. The locations of the various sensors may correspond to the locations of the sensors disclosed in FIGS. 2F-2I, for example. However, in some instances, the sensors may have other locations. Sensors location reference numbers are omitted from FIG. 2J for simplicity of the drawing. For each sensor unit of vehicle 250, FIG. 2J illustrates a representative field of view (e.g., fields of view labeled as 252A, 252B, 252C, 252D, 254A, 254B, 256, 258A, 258B, and 258C). The field of view of a sensor may include an angular region (e.g., an azimuthal angular region and/or an elevational angular region) over which the sensor may detect objects.

Figure 2K:
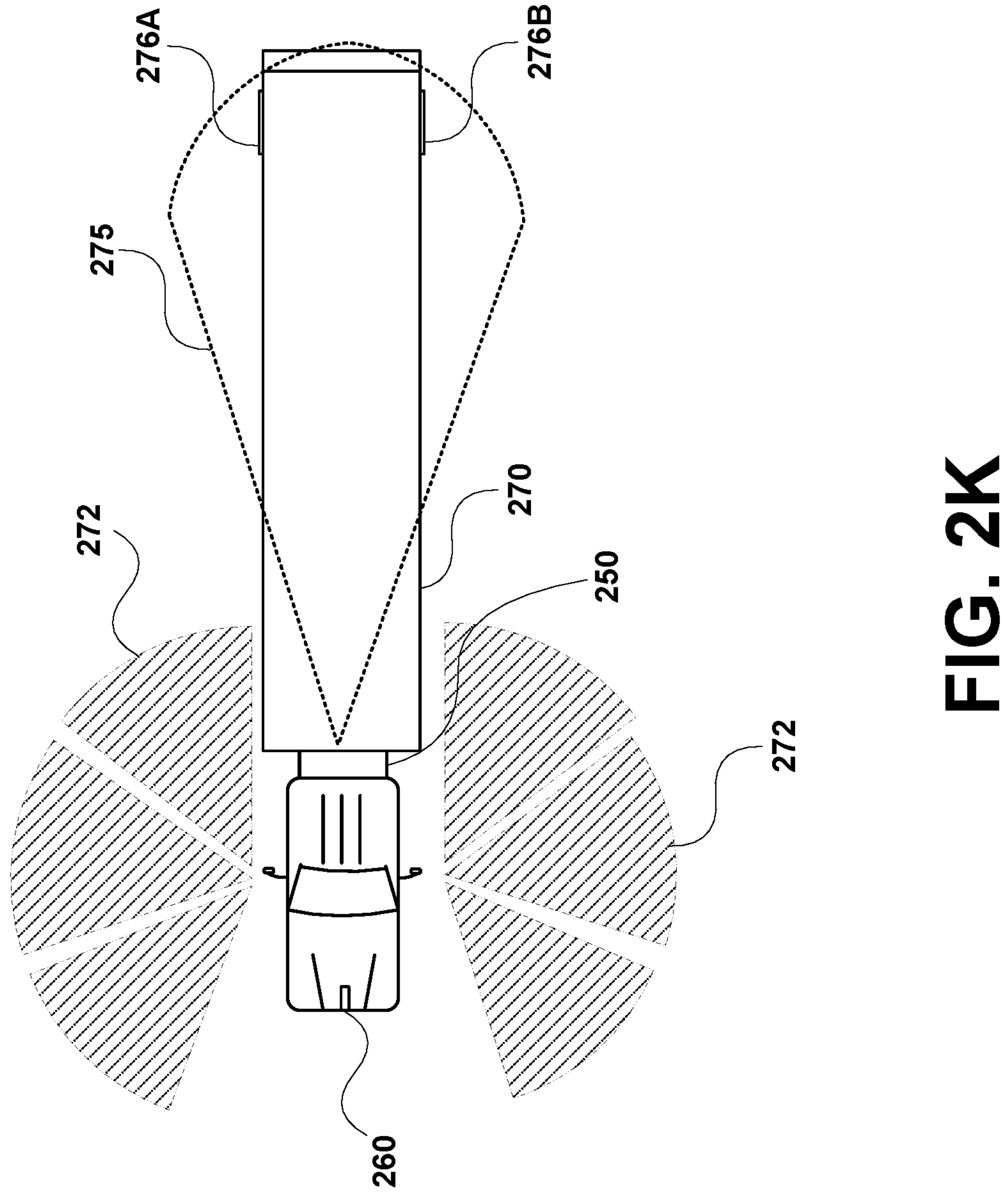
FIG. 2K is an illustration of beam steering for a sensor, according to example embodiments.

FIG. 2K illustrates beam steering for a sensor of a vehicle (e.g., the vehicle 250 shown and described with reference to FIGS. 2F-2J), according to example embodiments. In various embodiments, a sensor unit of vehicle 250 may be a radar, a lidar, a sonar, etc. Further, in some embodiments, during the operation of the sensor, the sensor may be scanned within the field of view of the sensor. Various different scanning angles for an example sensor are shown as regions 272, which each indicate the angular region over which the sensor is operating. The sensor may periodically or iteratively change the region over which it is operating. In some embodiments, multiple sensors may be used by vehicle 250 to measure regions 272. In addition, other regions may be included in other examples. For instance, one or more sensors may measure aspects of the trailer 270 of vehicle 250 and/or a region directly in front of vehicle 250.

At some angles, region of operation 275 of the sensor may include rear wheels 276A, 276B of trailer 270. Thus, the sensor may measure rear wheel 276A and/or rear wheel 276B during operation. For example, rear wheels 276A, 276B may reflect lidar signals or radar signals transmitted by the sensor. The sensor may receive the reflected signals from rear wheels 276A, 276. Therefore, the data collected by the sensor may include data from the reflections off the wheel.

In some instances, such as when the sensor is a radar, the reflections from rear wheels 276A, 276B may appear as noise in the received radar signals. Consequently, the radar may operate with an enhanced signal to noise ratio in instances where rear wheels 276A, 276B direct radar signals away from the sensor.

Figure 3:
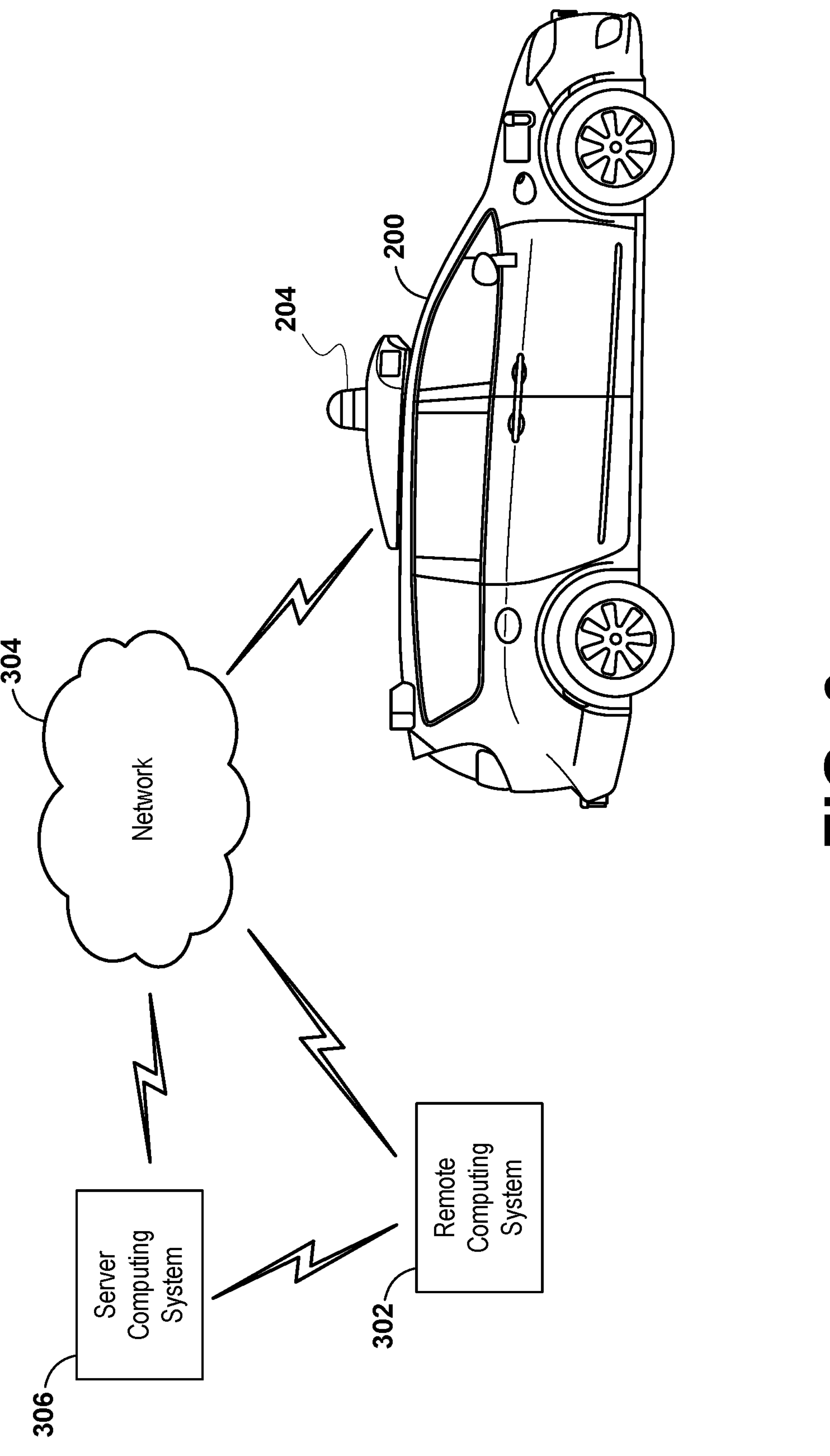
FIG. 3 is a conceptual illustration of wireless communication between various computing systems related to an autonomous or semi-autonomous vehicle, according to example embodiments.

FIG. 3 is a conceptual illustration of wireless communication between various computing systems related to an autonomous or semi-autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous or semi-autonomous mode that enables a control system to safely navigate vehicle 200 between destinations using sensor measurements. When operating in an autonomous or semi-autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the surrounding environment of an autonomous or semi-autonomous vehicle. In general, at least one computing system will be able to analyze the images and possibly control the autonomous or semi-autonomous vehicle.

In some embodiments, to facilitate autonomous or semi-autonomous operation, a vehicle (e.g., vehicle 200) may receive data representing objects in an environment surrounding the vehicle (also referred to herein as "environment data") in a variety of ways. A sensor system on the vehicle may provide the environment data representing objects of the surrounding environment. For example, the vehicle may have various sensors, including a camera, a radar, a lidar, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar may be configured to transmit an electromagnetic signal that will be reflected by various objects near the vehicle, and then capture electromagnetic signals that reflect off the objects. The captured reflected electromagnetic signals may enable the radar (or processing system) to make various determinations about objects that reflected the electromagnetic signal. For example, the distances to and positions of various reflecting objects may be determined. In some embodiments, the vehicle may have more than one radar in different orientations. The radar may be configured to store captured information to a memory for later processing by a processing system of the vehicle. The information captured by the radar may be environment data.

In another example, a lidar may be configured to transmit an electromagnetic signal (e.g., infrared light, such as that from a gas or diode laser, or other possible light source) that will be reflected by target objects near the vehicle. The lidar may be able to capture the reflected electromagnetic (e.g., infrared light) signals. The captured reflected electromagnetic signals may enable the range-finding system (or processing system) to determine a range to various objects. The lidar may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous or semi-autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the surrounding environment of the vehicle. For example, the processing system may combine data from both radar information and a captured image to determine if another vehicle or pedestrian is in front of the autonomous or semi-autonomous vehicle. In other embodiments, other combinations of sensor data may be used by the processing system to make determinations about the surrounding environment.

While operating in an autonomous mode (or semi-autonomous mode), the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously or semi-autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the surrounding environment (e.g., if there is actually a stop sign or if there is actually no stop sign present), (ii) confirm whether the vehicle's identification of the object is correct, (iii) correct the identification if the identification was incorrect, and/or (iv) provide a supplemental instruction (or modify a present instruction) for the autonomous or semi-autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the surrounding environment to determine at least one object having a detection confidence below a threshold. A processor in the vehicle may be configured to detect various objects of the surrounding environment based on environment data from various sensors. For example, in one embodiment, the processor may be configured to detect objects that may be important for the vehicle to recognize. Such objects may include pedestrians, bicyclists, street signs, other vehicles, indicator signals on other vehicles, and other various objects detected in the captured environment data.

The detection confidence may be indicative of a likelihood that the determined object is correctly identified in the surrounding environment, or is present in the surrounding environment. For example, the processor may perform object detection of objects within image data in the received environment data, and determine that at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the surrounding environment in various ways depending on the source of the environment data. In some embodiments, the environment data may come from a camera and be image or video data. In other embodiments, the environment data may come from a lidar. The vehicle may analyze the captured image or video data to identify objects in the image or video data. The methods and apparatuses may be configured to monitor image and/or video data for the presence of objects of the surrounding environment. In other embodiments, the environment data may be radar, audio, or other data. The vehicle may be configured to identify objects of the surrounding environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the surrounding environment, it may also calculate a confidence associated with the specific detected object. The confidence may be calculated in various ways depending on the embodiment. In one example, when detecting objects of the surrounding environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of the vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4A:
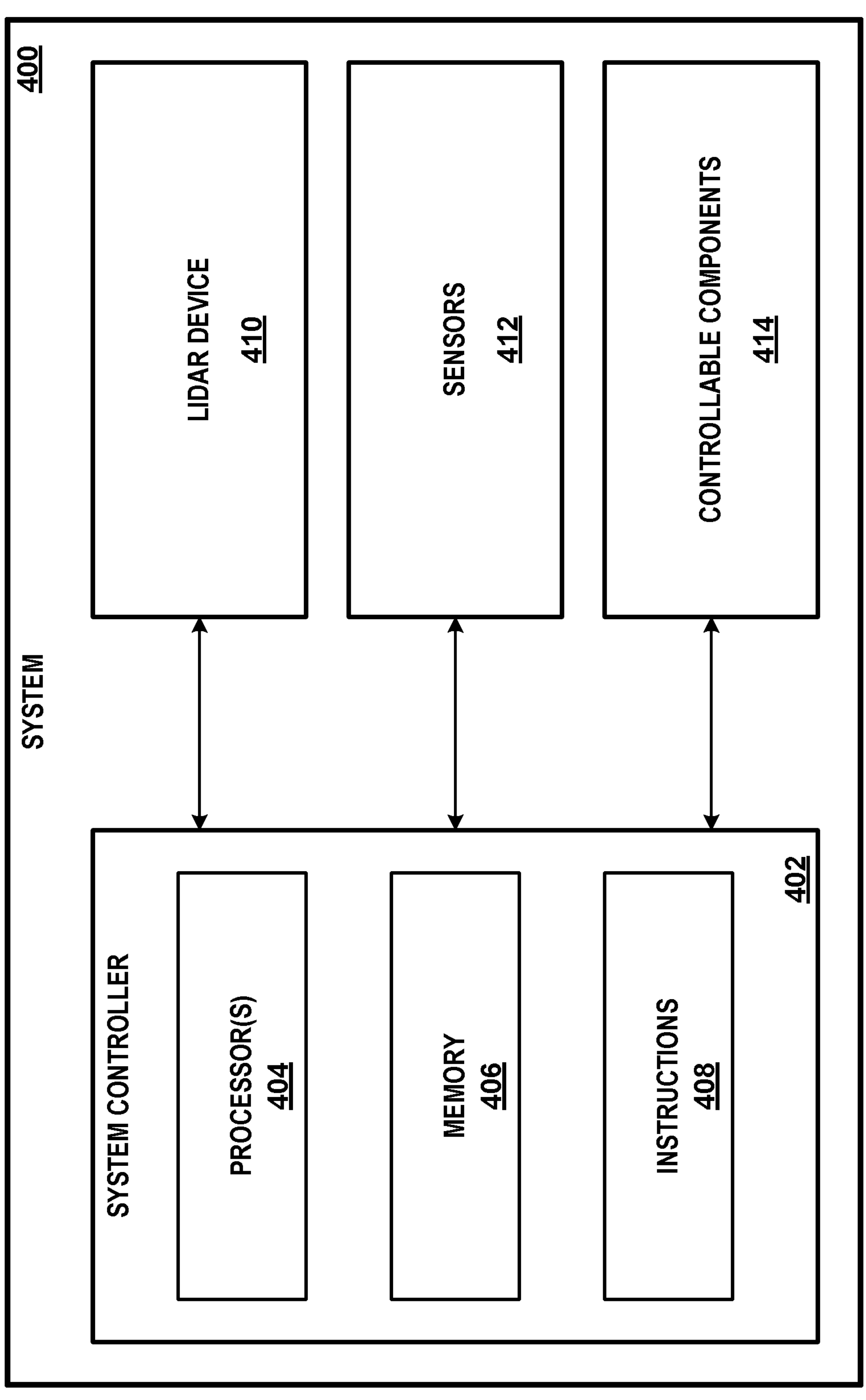
FIG. 4A is a block diagram of a system including a lidar device, according to example embodiments.

FIG. 4A is a block diagram of a system, according to example embodiments. In particular, FIG. 4A shows a system 400 that includes a system controller 402, a lidar device 410, a plurality of sensors 412, and a plurality of controllable components 414. System controller 402 includes processor(s) 404, a memory 406, and instructions 408 stored on the memory 406 and executable by the processor(s) 404 to perform functions.

The processor(s) 404 can include one or more processors, such as one or more general-purpose microprocessors (e.g., having a single core or multiple cores) and/or one or more special purpose microprocessors. The one or more processors may include, for instance, one or more central processing units (CPUs), one or more microcontrollers, one or more graphical processing units (GPUs), one or more tensor processing units (TPUs), one or more ASICs, and/or one or more field-programmable gate arrays (FPGAs). Other types of processors, computers, or devices configured to carry out software instructions are also contemplated herein.

The memory 406 may include a computer-readable medium, such as a non-transitory, computer-readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The lidar device 410, described further below, includes a plurality of light emitters configured to emit light (e.g., in light pulses) and one or more light detectors configured to detect light (e.g., reflected portions of the light pulses). The lidar device 410 may generate three-dimensional (3D) point cloud data from outputs of the light detector(s), and provide the 3D point cloud data to the system controller 402. The system controller 402, in turn, may perform operations on the 3D point cloud data to determine the characteristics of a surrounding environment (e.g., relative positions of objects within a surrounding environment, edge detection, object detection, and proximity sensing).

Similarly, the system controller 402 may use outputs from the plurality of sensors 412 to determine the characteristics of the system 400 and/or characteristics of the surrounding environment. For example, the sensors 412 may include one or more of a GPS, an IMU, an image capture device (e.g., a camera), a light sensor, a heat sensor, and other sensors indicative of parameters relevant to the system 400 and/or the surrounding environment. The lidar device 410 is depicted as separate from the sensors 412 for purposes of example, and may be considered as part of or as the sensors 412 in some examples.

Based on characteristics of the system 400 and/or the surrounding environment determined by the system controller 402 based on the outputs from the lidar device 410 and the sensors 412, the system controller 402 may control the controllable components 414 to perform one or more actions. For example, the system 400 may correspond to a vehicle, in which case the controllable components 414 may include a braking system, a turning system, and/or an accelerating system of the vehicle, and the system controller 402 may change aspects of these controllable components based on characteristics determined from the lidar device 410 and/or sensors 412 (e.g., when the system controller 402 controls the vehicle in an autonomous or semi-autonomous mode). Within examples, the lidar device 410 and the sensors 412 are also controllable by the system controller 402.

Figure 4B:
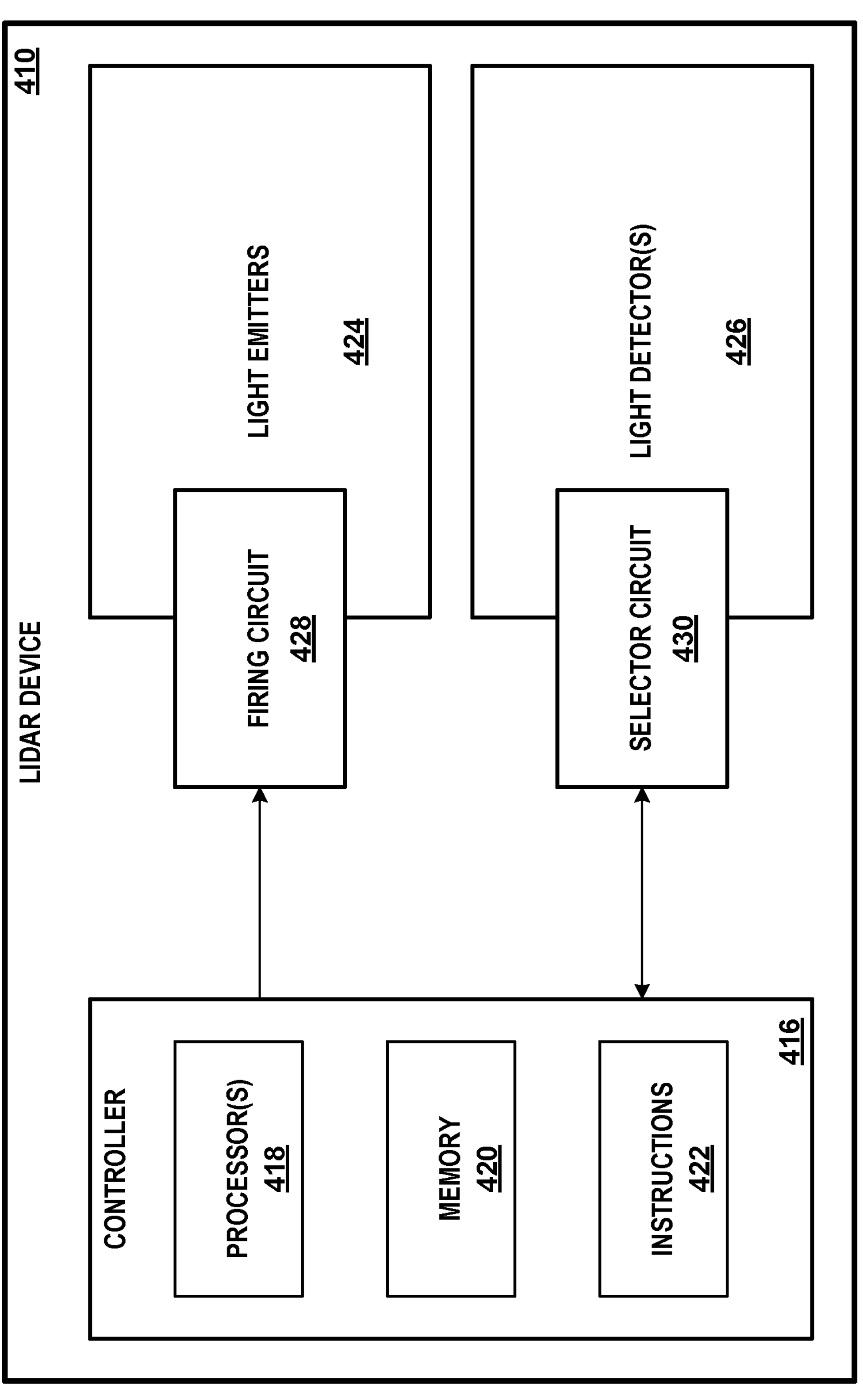
FIG. 4B is a block diagram of a lidar device, according to example embodiments.

FIG. 4B is a block diagram of a lidar device, according to an example embodiment. In particular, FIG. 4B shows a lidar device 410, having a controller 416 configured to control a plurality of light emitters 424 and one or more light detector(s), e.g., a plurality of light detectors 426, etc. The lidar device 410 further includes a firing circuit 428 configured to select and provide power to respective light emitters of the plurality of light emitters 424 and may include a selector circuit 430 configured to select respective light detectors of the plurality of light detectors 426. The controller 416 includes processor(s) 418, a memory 420, and instructions 422 stored on the memory 420.

Similar to processor(s) 404, the processor(s) 418 can include one or more processors, such as one or more general-purpose microprocessors and/or one or more special purpose microprocessors. The one or more processors may include, for instance, one or more CPUs, one or more microcontrollers, one or more GPUs, one or more TPUs, one or more ASICs, and/or one or more FPGAs. Other types of processors, computers, or devices configured to carry out software instructions are also contemplated herein.

Similar to memory 406, the memory 420 may include a computer-readable medium, such as a non-transitory, computer-readable medium, such as, but not limited to, ROM, PROM, EPROM, EEPROM, non-volatile random-access memory (e.g., flash memory), a SSD, a HDD, a CD, a DVD, a digital tape, R/W CDs, R/W DVDs, etc.

The instructions 422 are stored on memory 420 and executable by the processor(s) 418 to perform functions related to controlling the firing circuit 428 and the selector circuit 430, for generating 3D point cloud data, and for processing the 3D point cloud data (or perhaps facilitating processing the 3D point cloud data by another computing device, such as the system controller 402).

The controller 416 can determine 3D point cloud data by using the light emitters 424 to emit pulses of light. A time of emission is established for each light emitter and a relative location at the time of emission is also tracked. Aspects of a surrounding environment of the lidar device 410, such as various objects, reflect the pulses of light. For example, when the lidar device 410 is in a surrounding environment that includes a road, such objects may include vehicles, signs, pedestrians, road surfaces, or construction cones. Some objects may be more reflective than others, such that an intensity of reflected light may indicate a type of object that reflects the light pulses. Further, surfaces of objects may be at different positions relative to the lidar device 410, and thus take more or less time to reflect portions of light pulses back to the lidar device 410. Accordingly, the controller 416 may track a detection time at which a reflected light pulse is detected by a light detector and a relative position of the light detector at the detection time. By measuring time differences between emission times and detection times, the controller 416 can determine how far the light pulses travel prior to being received, and thus a relative distance of a corresponding object. By tracking relative positions at the emission times and detection times the controller 416 can determine an orientation of the light pulse and reflected light pulse relative to the lidar device 410, and thus a relative orientation of the object. By tracking intensities of received light pulses, the controller 416 can determine how reflective the object is. The 3D point cloud data determined based on this information may thus indicate relative positions of detected reflected light pulses (e.g., within a coordinate system, such as a Cartesian coordinate system) and intensities of each reflected light pulse.

The firing circuit 428 is used for selecting light emitters for emitting light pulses. The selector circuit 430 similarly is used for sampling outputs from light detectors.

As described above, various types of defects can adversely affect measurements made by sensing devices (e.g., lidar devices or cameras). For example, some sensing devices may include one or more optical components (e.g., lenses, mirrors, waveguides, optical coatings, and/or windows), and one or more defects in or on portions of such optical components can result in improper detections of the surrounding environment. For instance, an optical window (e.g., an optical element through which a camera or lidar detects the surrounding environment) may suffer from one or more scratches, cracks, smudges, deformations, air bubbles, impurities (e.g., chemical impurities within the glass or plastic of the optical window), degradations (e.g., decreased optical properties over time), discolorations, imperfect transparencies, or warpings within (e.g., inside a body of) one or more portions of the optical window. Additionally or alternatively, such an optical window may suffer from condensation, dirt, dust, mud, leaves, rain snow, sleet, hail, ice, or insect residue (i.e., the remains of dead insects) on one or more portions of the optical window (e.g., on one or more portions of the optical window that interfaces with the surrounding environment, i.e., on one or more exterior portions of the optical window). As additional examples of defects, the one or more optical components may include an optical coating (e.g., an antireflective coating, a hydrophobic coating, a polarization filter, a chromatic filter, and a neutral-density filter), and such an optical coating may degrade over time (e.g., suffer from a reduction in its antireflective properties, hydrophobic properties, or filtering properties) as a result of the optical coating's exposure to the surrounding environment (e.g., due to wind, condensation, insects, precipitation, ambient temperature fluctuations, ambient pressure fluctuations, exposure to ultraviolet light, or accumulation of dust/dirt). Even further, in some embodiments, defects may include one or more protective layers (e.g., protective films) remaining on an optical component after a time point at which they should have been removed (e.g., prior to operation). Such protective films may have undesirable or poorly characterized optical properties that can adversely affect detection. It is understood that other types of defects are also possible and are contemplated herein. Further, such defects may attenuate light signals, obscure light signals, block light signals, scatter light signals, redirect light signals, or otherwise interfere with light signals being received from the surrounding environment. Given the above, it is understood that the term "defect" is understood to broadly encompass both debris (e.g., from an external environment or from internal to the lidar device) that is present on a surface of one or more components, as well as imperfections within one or more components, themselves (e.g., fabrication imperfections, and degradations)

Figure 5:
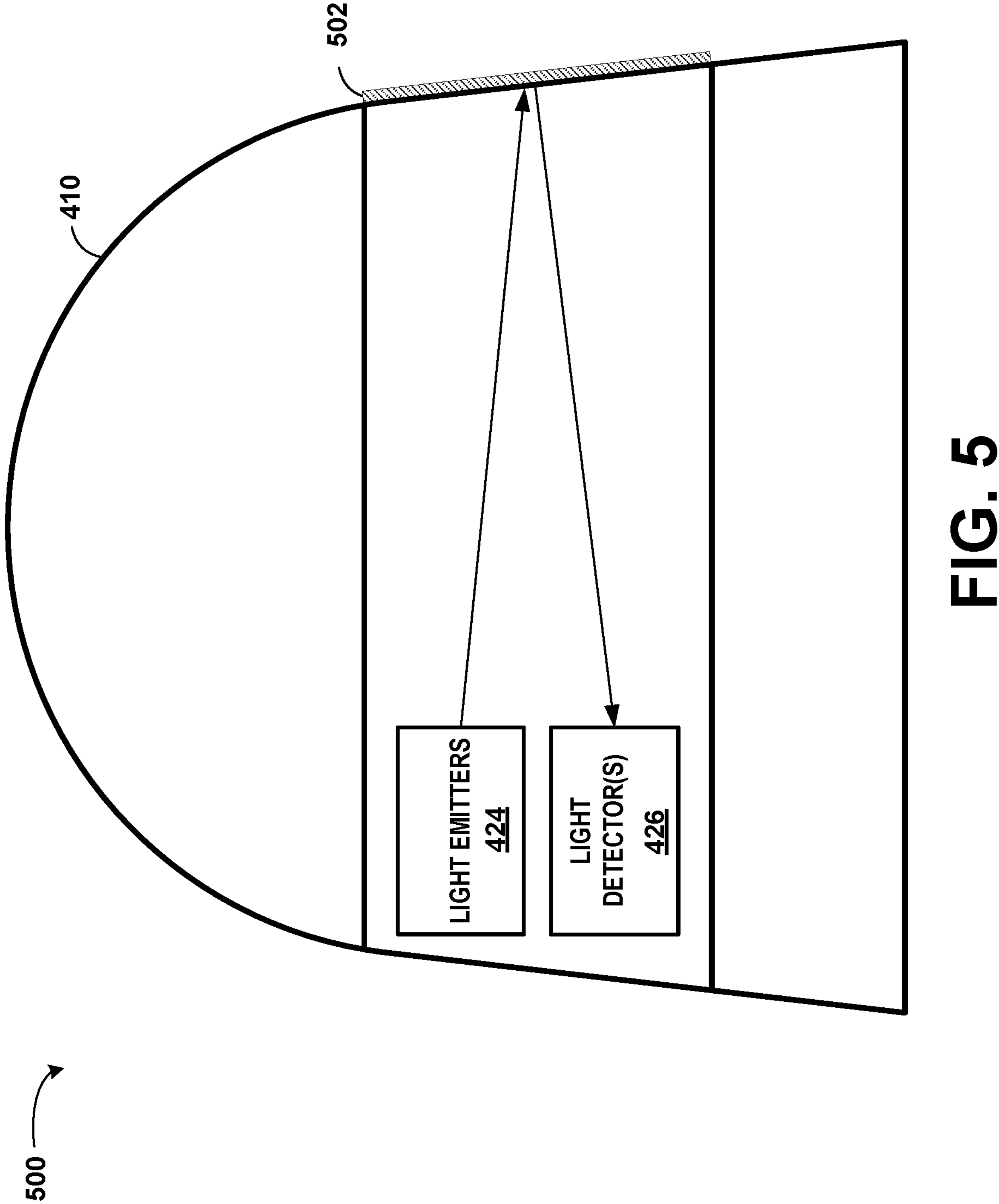
FIG. 5 is an illustration of a lidar device and an associated hydrophobic coating, according to example embodiments.

FIG. 5 illustrates an example system 500 (e.g., similar to the system 400 shown and described with reference to FIG. 4A). The system 500 may include the lidar device 410 (e.g., including the light emitters 424 and the light detector(s) 426). Further, as illustrated, the system 500 may include an optical component 502 (e.g., an optical coating, such as a hydrophobic coating) on or within the lidar device 410 (e.g., an optical coating on an optical window of the lidar device 410). As described above, in some embodiments, the optical component 502 may suffer from defects (e.g., degradations and debris) that degrade performance of the lidar device 410 (e.g., result in internal reflections of light signals from the light emitters 424 that are detected by the light detector(s) 426, as illustrated in FIG. 5). Such defects may be visible to the naked eye (e.g., a leaf) or invisible to the naked eye (e.g., small debris or minor cracks, deformations, and changes in refractive index). Further, while single defects may be present on an exterior of the optical component 502, it is understood that any number and/or type of defect(s) are also possible (e.g., on or within the optical component 502).

As illustrated in FIG. 5 by the internal reflection, defects may interfere with light signals emitted by light emitters (e.g., light emitters 424 of the lidar device 410, as shown and illustrated in FIG. 4B) and/or light signals attempting to be detected by light detectors (e.g., light detectors 426 of the lidar device 410, as shown and illustrated in FIG. 4B). Hence, as shown in FIG. 5, defects may affect measurements made of the surrounding environment using the light emitters 424 and light detectors 426.

Mitigating the adverse effects of defects may be desirable. This may be done by detecting the presence of one or more defects and then performing one or more remedial actions (e.g., cleaning the optical component at issue, replacing the optical component at issue, decommissioning all or part of the optical component at issue, flagging the data captured via the optical component by sensors as containing the influence of the defect, and performing post-processing on the data captured via the optical component by sensors in order to compensate for the influence of the defect). In order to detect the presence of one or more defects, techniques as described herein may be performed. Further, such techniques may be performed using one or more devices or systems as described herein.

In some embodiments, detecting the presence of one or more defects within an optical component (e.g., the optical component 502 of FIG. 5) may include sensing one or more types of defect signals. FIGS. 6A-6D illustrate various types of signals that can be detected by a lidar device. By disambiguating the different types of signals that can be detected by the lidar device and analyzing those disambiguated signals, determinations may be made about whether, to what extent, and which kinds of defects are present.

Figure 6A:
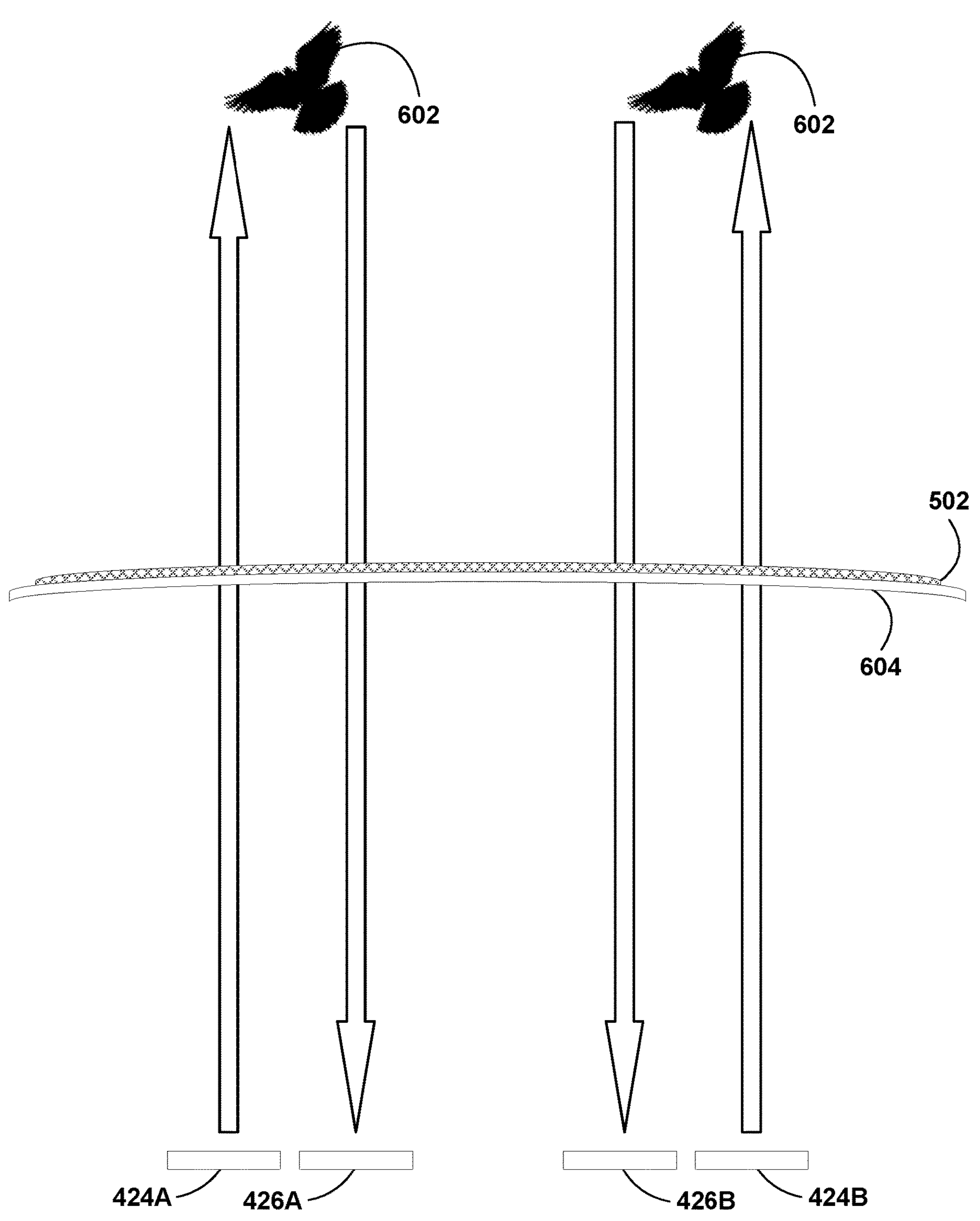
FIG. 6A is an illustration of object detection, according to example embodiments.

FIG. 6A illustrates a system detecting objects 602 in a surrounding environment (e.g., in the absence of defects). The system may include a lidar device (e.g., the lidar device 410 shown and described with reference to FIGS. 4A-5) and an optical component (e.g., the optical component 502 shown and described with reference to FIG. 5), which may be positioned on one or more components of the lidar device (e.g., an optical window 604 defined within a housing of the lidar device). As illustrated, the light emitters 424A, 424B and the corresponding light detectors 426A, 426B may be used by the lidar device to detect objects 602 in the surrounding environment (e.g., similar to the light emitters 424 and light detector(s) 426 shown and described with reference to FIG. 4B). For example, as illustrated by the arrows in FIG. 6A, the first light emitter 424A and the second light emitter 424B may each emit one or more light signals that are transmitted through the optical window 604 and the optical component 502 (e.g., if the optical component 502 is an optical coating) into the surrounding environment. The light signals may be reflected by objects 602 in the surrounding environment and directed to the corresponding first light detector 426A and second light detector 426B (e.g., again through the optical window 604/optical component 502) in order to provide information about the surrounding environment (e.g., distance to objects 602 in the surrounding environment based on time of flight). While FIG. 6A illustrates two light emitters 424A, 424B, two light detectors 426A, 426B, and an optical component 502, it is understood that other numbers and/or arrangements of light emitters, light detectors, and optical component(s) are also possible and are contemplated herein. For example, in some embodiments, the system may include an array of light emitters (e.g., more than two light emitters) and a corresponding array of light detectors (e.g., more than two light detectors). The arrays may be arranged such that light emitters and light detectors in the same channel are adjacent to one another. Additionally or alternatively, some embodiments may include multiple optical components and/or different types/positions of optical components.

Figure 6B:
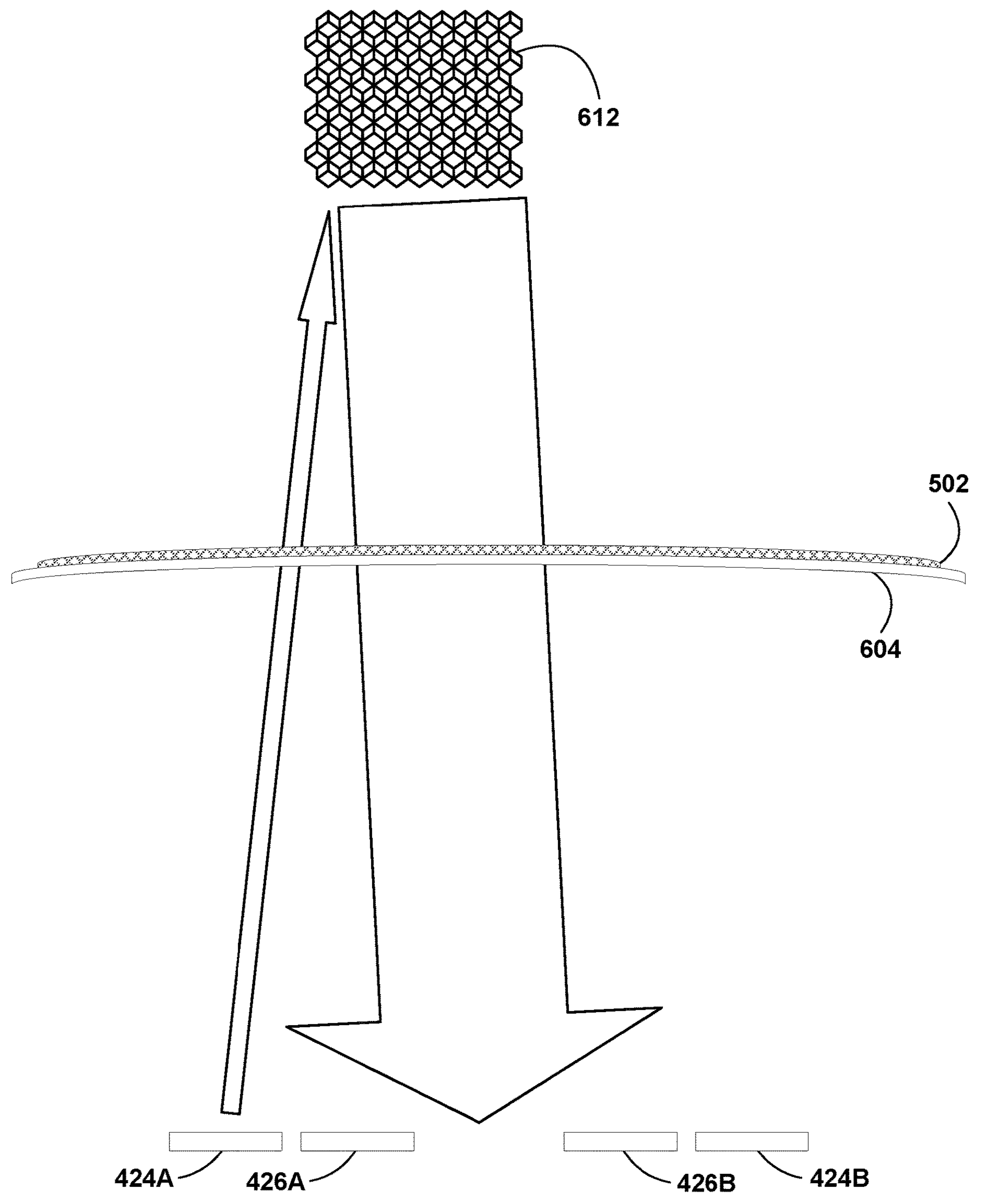
FIG. 6B is an illustration of crosstalk detection, according to example embodiments.
Figure 6C:
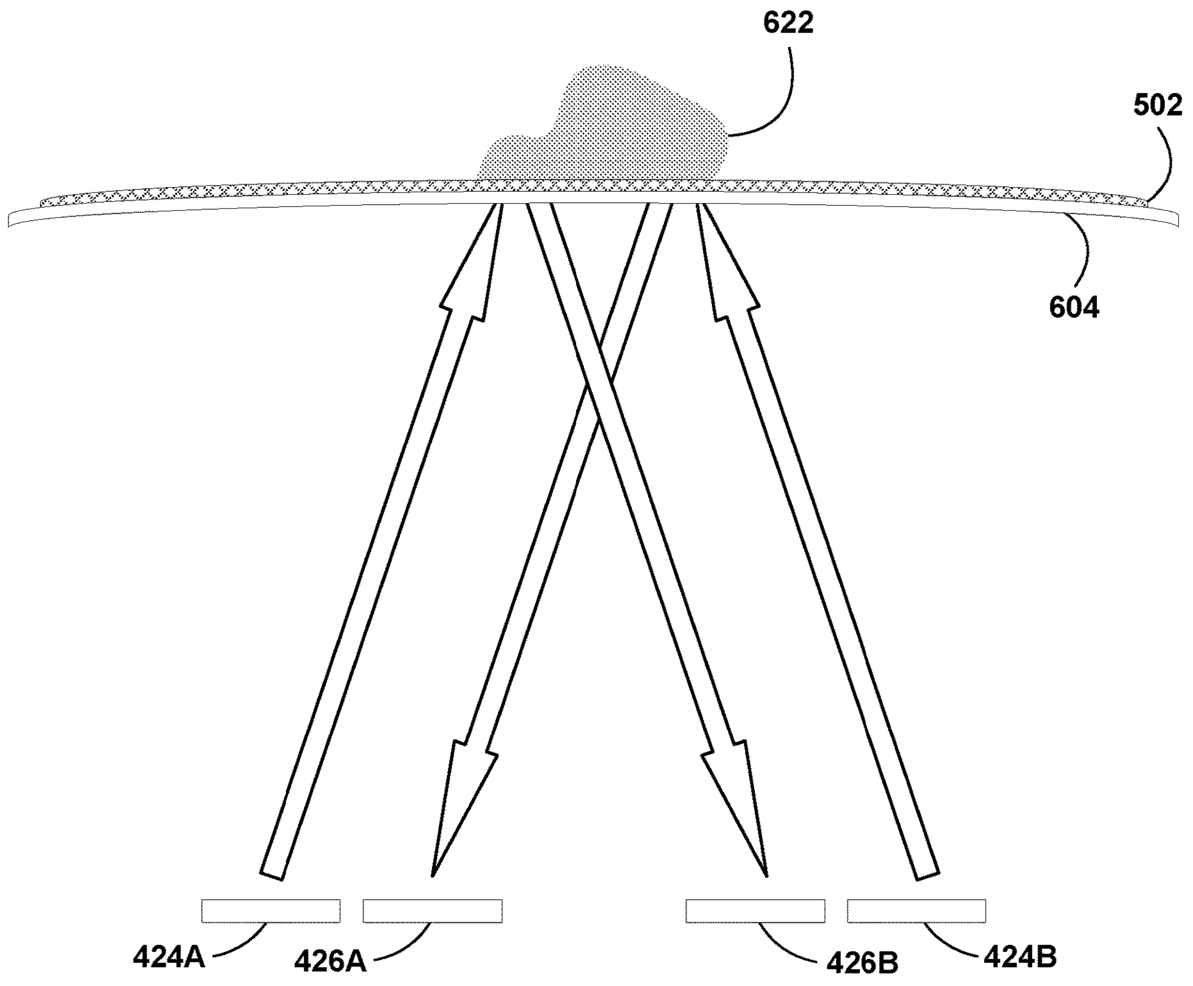
FIG. 6C is an illustration of crossfeedback detection, according to example embodiments.

Under certain circumstances (e.g., different from those illustrated in FIG. 6A), light signals detected by the light detectors 426A, 426B may have been emitted by the light emitters 424A, 424B and then reflected by something other than target objects 602 in the surrounding environment. In still other circumstances (e.g., different from those illustrated in FIG. 6A), light signals detected by the light detectors 426A, 426B may have been reflected in such a way as to be directed to light detector(s) 426A, 426B for which those light signals were not intended. FIGS. 6B and 6C illustrate examples of the circumstances described above. For instance, FIG. 6B illustrates an example of crosstalk detection, while FIG. 6C illustrates an example of cross-feedback detection.

Sometimes, when interacting with certain objects in a surrounding environment, light signals emitted by the light emitters 424A, 424B may result in crosstalk. For example, as illustrated in FIG. 6B, the first light emitter 424A may emit a light signal into a surrounding environment. Typically, upon the emitted light signal being reflected by a surface having a low or moderate reflectivity, a low or moderate intensity reflected light signal may be directed back to the first detector 426A. As illustrated in FIG. 6B, though, if the light signal emitted from the first light emitter 424A into the surrounding environment is reflected by an object having a high or extremely high reflectivity (e.g., a reflectivity above a threshold value, such as a retroreflector 612, which may be part of a road sign), the intensity of the reflected signal may be correspondingly higher and/or the reflected signal may correspondingly occupy a larger detectable area when incident on the light detectors 426A, 426B (sometimes referred to as a "blooming" effect). As illustrated in FIG. 6B, a high-intensity reflected light signal may illuminate a plurality of light detectors 426A, 426B rather than simply the intended light detector, which corresponds to the channel of the emitted signal (e.g., the first light detector 426A). For example, the high-intensity reflected light signal may illuminate the second light detector 426B, in addition to the first light detector 426A. The second light detector 426B, therefore, may detect crosstalk (i.e., detect a crosstalk signal resulting from the emitted signal of the first light emitter 424A) meaning that the second light detector 426B may be undesirably influenced by light from the first channel (e.g., which may result in noise or improper detection events based on the detections of the second light detector 426B).

It is understood that which of the light detectors within the lidar device (e.g., which of the light detectors 426 shown and described with reference to FIG. 4B) can detect a given reflected signal (e.g., which light detectors 426 are susceptible to crosstalk) may depend on the intensity of the reflected signal (e.g., based on the reflectivity of the surface in the surrounding environment), the sensitivity of the light detectors 426, the location of the light detectors 426 in the lidar device, the orientation of the light detectors 426 in the lidar device (e.g., the azimuthal/yaw angular orientation and/or elevation/pitch angular orientation of the light detectors 426), and the distance to the reflecting object in the surrounding environment. For example, because reflected light signals may attenuate/diverge as they propagate through the surrounding environment (e.g., because of dust, smoke, etc. in the surrounding environment), the intensity of a light signal may decrease the farther the separation between the lidar device and the reflecting object. As a result, the number of light detectors 426 within the lidar device that detect crosstalk as a result of a light signal reflected from a high-reflectivity object may be larger the closer the lidar device is to the high-reflectivity object.

Under certain circumstances, light signals detected by the light detectors 426A, 426B may have been emitted by the light emitters 424A, 424B and then reflected by something other than target objects in the surrounding environment. For example, as illustrated in FIG. 6C, there may be a defect 622 present (e.g., debris, such as mud or condensation; a degradation; and a bend/warp present within or on the optical component 502). As illustrated, the defect 622 may reflect light signals transmitted by the light emitters 424A, 424B that were intended to probe the surrounding environment and then redirect the light signals to the light detectors 426A, 426B. Further, a first light emitter 424A may emit light signals that are intended for a first light detector 426A when reflected from objects in the surrounding environment (e.g., as illustrated in FIG. 6A) and a second light emitter 424B may emit light signals that are intended for a second light detector 426B when reflected from objects in the surrounding environment (e.g., as illustrated in FIG. 6A). However, when such emitted light signals are reflected from the defect 622, they may be directed to unintended light detectors. For example, a light signal emitted by the first light emitter 424A may be directed to and detected by the second light detector 426B and a light signal emitted by the second light emitter 426B may be directed to and detected by the first light detector 426A (e.g., as illustrated in FIG. 6C). In some embodiments, such redirected light signals may be partially diffused or otherwise dispersed after interacting with the defect 622. Because such light signals are redirected by the defect 622 to light detectors for which those light signals might not have been originally intended, such redirected light signals may be referred to as “crossfeedback signals” herein. In other words, “crossfeedback signals” occur when one or more light signals emitted from a light emitter of one channel are internally reflected (e.g., off of defects on or in one or more optical components of a system) and redirected, which results in a light detector of a different channel (e.g., an adjacent channel) detecting that light signal. While FIG. 6C illustrates “crossfeedback signals” that are redirected by a defect 622, it is understood that, even in the absence of any defects, “crossfeedback signals” having non-zero intensities may be detected. For example, internal reflections off of one or more optical components (e.g., lenses and mirrors) of the lidar device may be detected as “crossfeedback signals.” While “crossfeedback signals” may be detected even in the absence of defects, it is understood that, in some embodiments, the intensity of a detected “crossfeedback signal” may be higher in the presence of defects than in the absence of defects.

Various techniques may be used to disambiguate “crossfeedback signals” from other signals. For example, “crossfeedback signals” may arrive earlier to the detectors during a detection cycle than other signals. As such, based on the timing window associated with a detection event, a detected signal may be labeled as either crossfeedback or non-crossfeedback. In some embodiments, the biasing of the light detectors (e.g., biasing of SiPMs used for the light detectors) may be set such that crossfeedback can be detected, but non-crossfeedback cannot. For example, the light detectors may be debiased after a certain amount of time has elapsed that corresponds to detection distances beyond which crossfeedback would occur.

While FIG. 6C illustrates an example where a defect 622 that is external to the optical component 502 and the lidar device is reflecting/redirecting light signals emitted by the light emitters 424A, 424B, it is understood that other embodiments are also possible and contemplated herein. For example, crossfeedback signals may be detected based on reflections from internal optics (e.g., mirrors and lenses) and/or mechanical components (e.g., mounts, actuators, and motors) within the system (e.g., within the lidar device associated with the light emitters 424A, 424B and the light detectors 426A, 426B).

Crosstalk and crossfeedback signals (e.g., as shown and described with reference to FIGS. 6B and 6C) may be useful in identifying types of defects associated with the system (e.g., defects associated with the optical component 502). For example, signals detected by light detectors 426 of a lidar device may be analyzed (e.g., by a computing device, such as the system controller 402 or the lidar controller 416 illustrated in FIGS. 4A and 4B) to determine the presence, absence, location, and/or intensity (e.g., intensity waveform) of crosstalk and/or crossfeedback signals. Then, by comparing the determined presence, absence, location, and/or intensity (e.g., intensity waveform) of the crosstalk and/or crossfeedback signals to calibration measurements (e.g., taken when it is known that no defects are present, certain types of defects are present, and/or defects are present at known locations), a determination of the presence, absence, type, and/or location of one or more defects can be made. In addition to or instead of using crosstalk and crossfeedback signals (e.g., as detected by light detectors 426 of a lidar device) to make such determinations, images captured by an image sensor (e.g., a camera) can be used to identify defects.

Figure 6D:
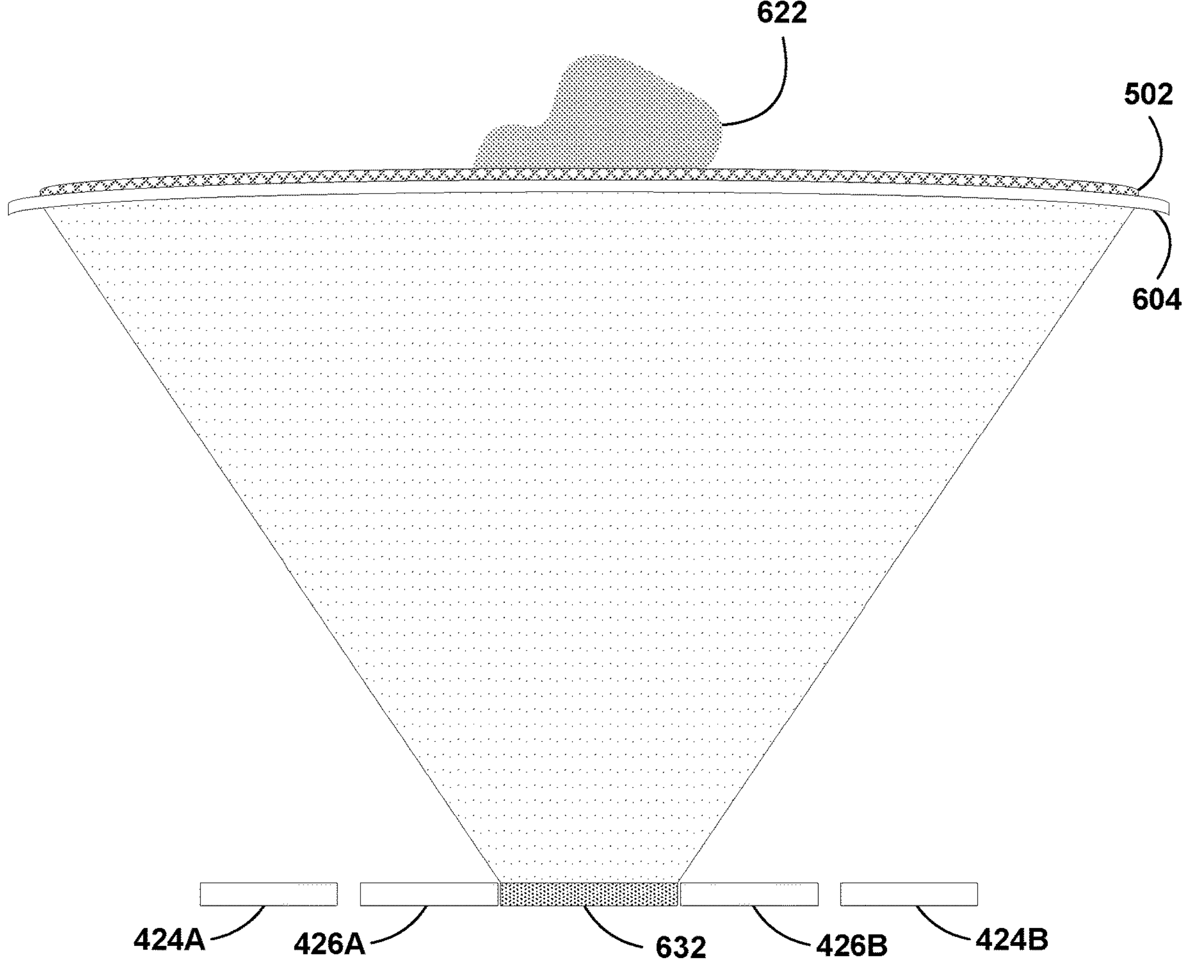
FIG. 6D is an illustration of occlusion detection, according to example embodiments.

As illustrated in FIG. 6D, an image sensor 632 (e.g., a charge-coupled device (CCD)) may be arranged to capture an image of the optical component 502 (e.g., of the entirety of the optical component 502 or the portion of the optical component 502 through which light signals detectable by the light detectors 426, 426B travel). Additionally or alternatively, the image sensor 632 may be configured to capture an image of the optical window 604 and/or of interior portions of the lidar device. As shown in FIG. 6D, the image sensor 632 may be positioned at a focal plane associated with the light detectors 426A, 426B. While not illustrated in FIG. 6D, it is understood that additional components may be used to assist the image sensor 632 in capturing an image of the optical component 502 or other portion of the system. For example, one or more lenses, photographic flashes, mirrors, apertures, etc. may be used in association with the image sensor 632 to capture an image.

Upon capturing an image of the optical component 502 or other portion of the system, the image may be analyzed (e.g., by a computing device) in order to determine what percentage of the optical component 502 (or other portion of the system), if any, is occluded by one or more defects 622 (e.g., by mud, condensation, cracks, and deformations). Such an image analysis may be performed using a machine-learned model (e.g., a classifier that was trained on one or more labeled training images, which had known occlusion percentages). The percentage of occlusion that is determined may represent an additional metric (e.g., in addition to the intensity, location, timing, etc. of the detected crosstalk signal(s) and/or crossfeedback signal(s)) used to characterize the presence, absence, location, and/or type of defect 622 associated with the system at the time the image was captured. Like the crosstalk signals and crossfeedback signals described above, the percentage of occlusion and/or the location of the occlusion captured in the image may be compared (e.g., by a computing device) to one or more calibration images or calibration metrics (e.g., a calibration percentage of occlusion) to make a determination about the presence, absence, location, and/or type of defect present on or in the optical component 502.

As described above, crosstalk signals (e.g., detected by a light detector 426 of a lidar device 410), crossfeedback signals (e.g., detected by a light detector 426 of a lidar device 410), and/or percentage of occlusion (e.g., determined by a computing device based on an image captured by an image sensor 632) may be used in analyzing defects associated with a system (e.g., a lidar device 410 and/or an associated optical component 502). Given this, changes in crosstalk signals, crossfeedback signals, and/or percentages of occlusion over time could be used to characterize changes to defects over time. Further, though, some types of defects evolve over time based on the behavior of the system. For example, if the optical component 502 is a hydrophobic coating and one or more water droplets are applied to the optical component 502 (e.g., as a result of rain and/or condensation), these water droplets should aggregate and be shed from the optical component 502 as time progresses. By monitoring the evolution of crossfeedback signals, crosstalk signals, and/or percentages of occlusion over time, a determination about the hydrophobic qualities of the hydrophobic coating (e.g., about how rapidly/completely the water is aggregated/shed from the hydrophobic coating) can be made. In other words, a defect, such as a degradation (e.g., a chemical degradation or a physical degradation as a result of exposure to the surrounding environment), of the hydrophobic coating (e.g., resulting in a reduced hydrophobicity) can be monitored over time. Similarly, if one or more defects are present within the optical component 502 (e.g., air bubbles, cracks, imperfect transparencies, and bends), the evolution of such defects could be monitored by monitoring the crosstalk signals, crossfeedback signals, and/or percentage of occlusion over time. For example, a determination could be made whether a crack in the optical component 502 was expanding over time by analyzing the crosstalk signals, crossfeedback signals, and/or percentage of occlusion over time. Other types of defect monitoring with respect to time (e.g., for various types of optical components) are also possible and contemplated herein using the signals and metrics described throughout.

Figure 7A:
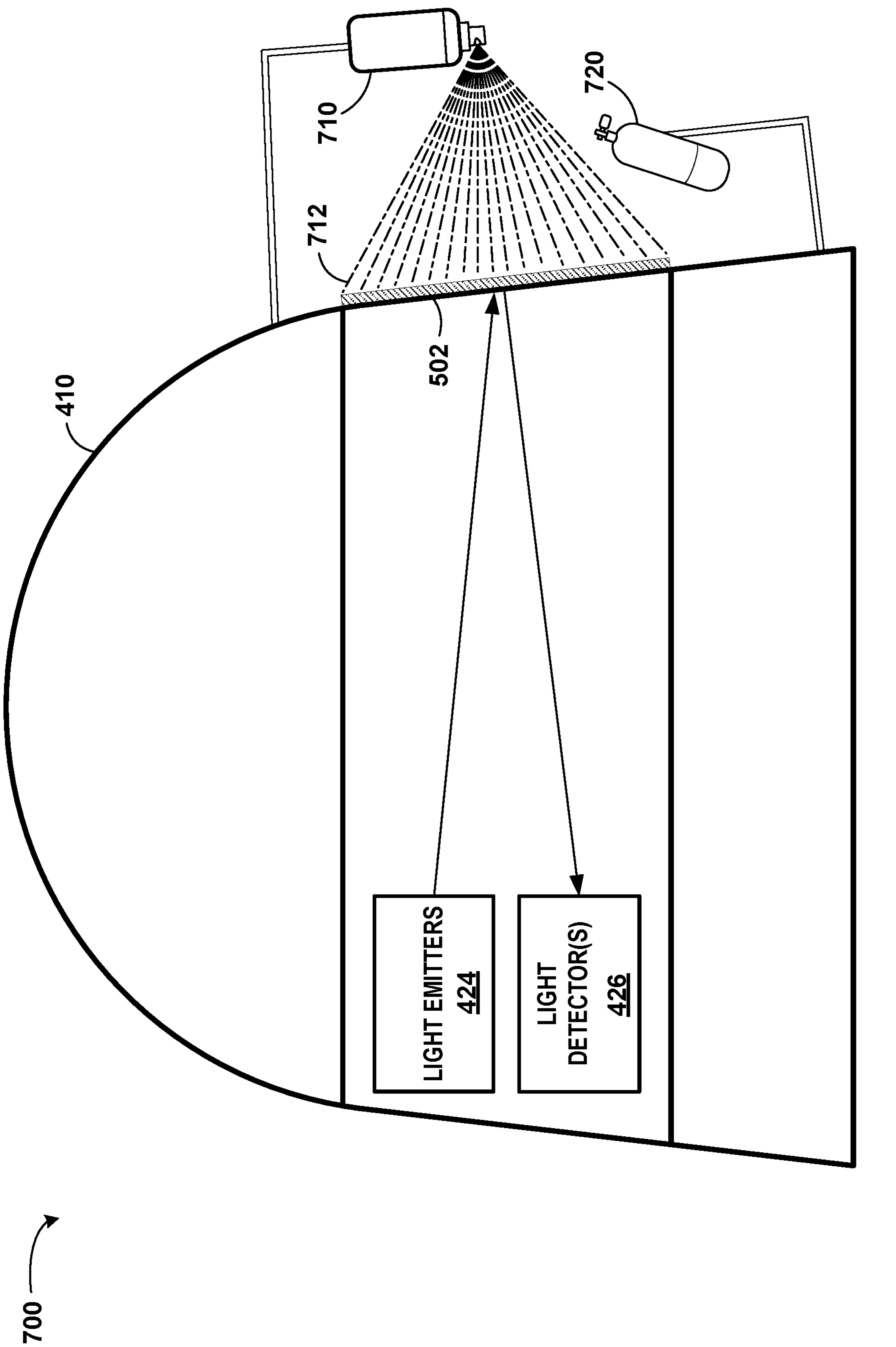
FIG. 7A is an illustration of a system with a cleaning device applying a cleaning protocol, according to example embodiments.
Figure 7B:
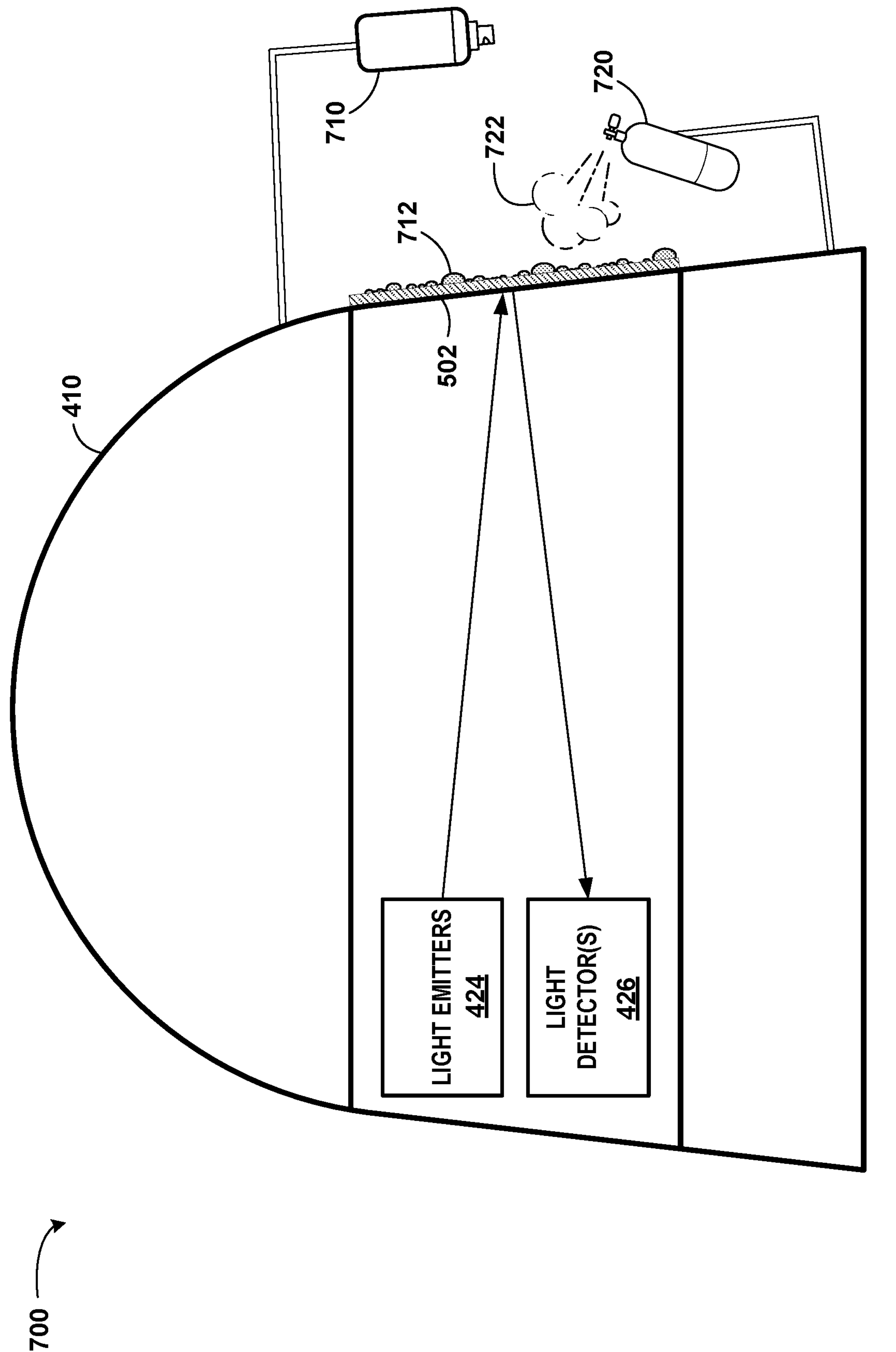
FIG. 7B is an illustration of a system with a cleaning device applying a cleaning protocol, according to example embodiments.

In light of the above, techniques described herein may include intentionally introducing one or more defects into a system (e.g., into or onto the optical component 502) and then monitoring various metrics (e.g., metrics based on crosstalk signals, crossfeedback signals, and/or captured images) over time to determine the health of the system (e.g., the ability of the system to adequately process, remove, address, account for, etc. defects present within the system). FIGS. 7A and 7B illustrate one technique of intentionally introducing defects and monitoring the handling of those defects over time. In particular, FIGS. 7A and 7B illustrate a system 700 that includes a lidar device (e.g., the lidar device 410 shown and described with reference to FIGS. 4A and 4B), an optical component (e.g., the optical component 502 shown and described with reference to FIGS. 5-6D), and a cleaning device. As illustrated, the cleaning device may include a sprayer 710 and a pressurized air supply 720. It is understood that the cleaning device illustrated in FIGS. 7A and 7B is provided solely as an example and that other cleaning devices are also possible and are contemplated herein (e.g., cleaning devices that include one or more wipers, such as windshield wipers; heaters, such as defrosters; cooling units; fans; vacuums; and actuators, such as motors, centrifuge units, mechanical stages, or vibrators). Still further, in some embodiments, the cleaning device may serve multiple purposes. For example, the cleaning device may include a motor that is used to spin one or more components of the lidar device 410 (e.g., spinning the light emitters 424 and light detectors 426 of the lidar device 410 relative to the surrounding environment). When the motor spins the lidar device 410, this may allow the light emitters 424 and light detectors 426 to analyze a larger portion of the surrounding environment (e.g., by azimuthally scanning the surrounding environment). Additionally, though, when the motor spins the lidar device 410, it may serve to clean the lidar device 410 (e.g., by removing previously applied cleaning solution or by removing condensation, rain, snow, and debris from the lidar device 410). The system 700 of FIGS. 7A and 7B may be configured to perform a multi-stage cleaning protocol, as illustrated in FIGS. 7A and 7B.

FIG. 7A illustrates a step of a cleaning protocol. As illustrated, the cleaning protocol may include the sprayer 710 applying a cleaning solution 712 to one or more components of the system 700 (e.g., to an exterior surface of the optical component 502). The cleaning solution 712 may be applied to a portion of the exterior surface of the optical component 502 or to the entirety of the exterior surface of the optical component 502. In some embodiments, the cleaning solution 712 may be applied via a nozzle of the sprayer 710, for example. The sprayer 710 may also include one or more actuators (e.g., motors and stages) configured to aim the sprayer 710 at specific regions of the lidar device 410 and/or the optical component 502. Further, the cleaning solution 712 may include various compounds in various concentrations (e.g., deionized water and isopropyl alcohol). Additionally, the cleaning protocol may include a predefined or selectable number of sprays of cleaning solution 712 to be applied (e.g., one spray, two sprays, three sprays, four sprays, five sprays, six sprays, seven sprays, eight sprays, nine sprays, and ten sprays). If the number of sprays is greater than one, the number of sprays may be distributed (e.g., evenly) over a predefined or selectable time period (e.g., five seconds, ten seconds, twenty seconds, thirty seconds, and a minute) according to an application frequency (e.g., 0.25 Hz, 0.5 Hz, 0.75 Hz, 1 Hz, 1.5 Hz, 2 Hz, and 2.5 Hz). Yet further, the cleaning protocol may be initiated according to a periodic schedule (e.g., once every half hour, once an hour, once every four hours, once every twelve hours, once a day, once every two days, once every four days, once a week, once every two weeks, and once a month). Additionally or alternatively, the cleaning protocol may be initiated in response to a request (e.g., from a user providing instructions through a mobile application or a browser-based application, from a lidar controller 416, and from a system controller 402). Still further, the cleaning protocol may be initiated in response to one or more thresholds being satisfied (e.g., a determination by the lidar controller 416 that an intensity of or number of detected crossfeedback signals is above a predefined threshold).

As illustrated by the arrows, while the cleaning solution 712 is being applied to one or more components of the system 700, light emitters 424 of the lidar device 410 may be emitting one or more light signals. These light signals may be reflected by the cleaning solution 712 being applied to the surface of the optical component 502 and then detected by light detectors 426 of the lidar device 410. Hence, such detected signals may represent crossfeedback signals (as shown and described above with respect to FIG. 6C) when those signals are being directed to light detectors 426 in different channels than the corresponding light emitter 424 that emitted the light signal.

FIG. 7B illustrates another step of a cleaning protocol. As illustrated, the cleaning protocol may include the pressurized air supply 720 applying pressurized air 722 to one or more components of the system 700 (e.g., to an exterior surface of the optical component 502). The pressurized air 722 may be applied subsequent to the application of the cleaning solution 712 (e.g., as shown and described with reference to FIG. 7A). The pressurized air 722 may be applied to a portion of the exterior surface of the optical component 502 (e.g., the portion to which a cleaning solution 712 was applied if the cleaning solution 712 was only applied to a portion of the optical component 502) or to the entirety of the exterior surface of the optical component 502. The pressurized air supply 720 may also include one or more actuators (e.g., motors and stages) configured to aim the pressurized air supply 720 at specific regions of the lidar device 410 and/or the optical component 502. Additionally, the cleaning protocol may include a predefined or selectable number of applications of pressurized air 722 (e.g., one puff, two puffs, three puffs, four puffs, five puffs, six puffs, seven puffs, eight puffs, nine puffs, and ten puffs). If the number of puffs is greater than one, the number of puffs may be distributed (e.g., evenly) over a predefined or selectable time period (e.g., five seconds, ten seconds, twenty seconds, thirty seconds, and a minute) according to an application frequency (e.g., 0.25 Hz, 0.5 Hz, 0.75 Hz, 1 Hz, 1.5 Hz, 2 Hz, and 2.5 Hz). Yet further, the step of the cleaning protocol illustrated in FIG. 7B may be initiated in response to completion of the step of the cleaning protocol illustrated in FIG. 7A.

As illustrated by the arrows, while the pressurized air 722 is being applied to one or more components of the system 700, light emitters 424 of the lidar device 410 may be emitting one or more light signals. These light signals may be reflected by the cleaning solution 712 on the surface of the optical component 502 and then detected by light detectors 426 of the lidar device 410. Hence, such detected signals may represent crossfeedback signals (e.g., as shown and described above with respect to FIG. 6C) when those signals are being directed to light detectors 426 in different channels than the corresponding light emitter 424 that emitted the light signal.

As indicated by the description above, light signals may be emitted by the light emitters 424 and detected by the light detectors 426 during the performance of a cleaning protocol by a cleaning device. By analyzing the detected light signals, determinations regarding the presence of defects, absence of defects, locations of defects, types of defects, and/or time-evolution of defects within the system 700 (e.g., on an exterior surface of the optical component 502) can be made. Such determinations may be made by the system controller 402 and/or the lidar controller 416, for example. Further such determinations can be used to estimate the health of one or more components of the system 700. For example, based on the time-evolution of the cleaning solution 712 being removed from an exterior surface of the optical component 502 (e.g., by the application of the pressurized air 722 during the cleaning protocol), a determination can be made (e.g., by the system controller 402 and/or the lidar controller 416) about hydrophobic qualities of the optical component 502 (e.g., when the optical component 502 is or includes a hydrophobic coating). These determined hydrophobic qualities can indicate a level of degradation of the hydrophobic coating over time (e.g., due to exposure to the surrounding environment). A lower level of degradation may correspond to enhanced beading of the cleaning solution 712 and/or faster shedding of the cleaning solution 712 due to the applied pressurized air 722, for instance. Other qualities can be analyzed using similar techniques and are contemplated herein as well (e.g., optical qualities, such as polarization, reflectivity, absorptivity, transmissivity, and refractive index).

Example techniques for making determinations about the qualities of one or more components of the system 700 based on the detected light signals are described in further detail below with reference to FIGS. 8A and 8B. In some embodiments, such determinations about the qualities of one or more components might be performed each time a cleaning protocol (e.g., the cleaning protocol illustrated in FIGS. 7A and 7B) is performed. Alternatively, such determinations about the qualities of one or more components might only be performed for a subset of cleanings (e.g., every second time a cleaning protocol is performed, every third time a cleaning protocol is performed, and every fourth time a cleaning protocol is performed) and/or only for specific types of cleanings (e.g., only when the optical component 502 is being cleaned and only when the sprayer 710/pressurized air supply 720 are involved in the cleaning).

A cleaning protocol can be initiated for the purpose of cleaning the system 700 (e.g., cleaning debris or other occlusions from the exterior surface of the optical component 502). However, in some embodiments, the cleaning protocol may be initiated with the sole intent of performing diagnostics on one or more components of the system 700 (e.g., in order to determine the present condition of the optical component 502). Because the cleaning device may include one or more components capable of applying a defect to the system 700 (e.g., applying cleaning solution 712 to the optical component 502 using the sprayer 710), initiating the cleaning protocol may be a straightforward, repeatable, and consistent process by which defects can be introduced into the system 700 and monitored. Further, since such a process is repeatable and consistent (as opposed to, for example, defects arising as a result of precipitation from the surrounding environment), results can be compared from one diagnostic test to another (e.g., making the process of accurately monitoring the health of components of the system 700 over time possible). In various embodiments, a cleaning protocol initiated in order to perform diagnostics on one or more components of the system 700 may be a standardized cleaning protocol (e.g., the same cleaning protocol under the same conditions as would be performed to simply clean the system 700). Alternatively, a cleaning protocol initiated in order to perform diagnostics on one or more components of the system 700 may be a cleaning protocol that is altered to enhance its diagnostic capabilities (e.g., a cleaning protocol of different intensity or duration than a standard cleaning protocol and a cleaning protocol that uses a different cleaning device).

Further, as shown and described with reference to FIGS. 7A and 7B, light emitter(s) 424 may emit light signals that are reflected from one or more defects and detected by one or more light detector(s) 426. It is understood, however, that some portion of the light signals emitted by the light emitter(s) 424 may pass through to the surrounding environment unaffected by the defects (e.g., the cleaning solution 712) present. Such light signals may then be reflected from objects in the surrounding environment and redirected to and detected by corresponding light detectors 426 in the lidar device 410 (e.g., similar to the process illustrated in FIG. 6A). Given this, while some of the light signals detected by the light detectors 426 may represent crossfeedback signals (e.g., and, therefore, be used to perform diagnostics of the optical component 502), other light signals may still be used to provide information about the surrounding environment (e.g., distances to objects in the surrounding environment based on time of flight of the respective light signals). In some embodiments, crossfeedback signals could be disambiguated from object-reflection signals based on time of flight (e.g., signals corresponding to times of flight that represent distances closer than a threshold distance, such as 5 cm, from the optical component 502 may be determined to represent crossfeedback signals). Additionally or alternatively, crossfeedback signals could be disambiguated from object-reflection signals based on empirical data (e.g., a determination may be made during calibration that certain light emitter/light detector channels detect crossfeedback signals when a cleaning protocol is performed and, hence, signals from those channels are deemed to be crossfeedback signals in run-time). Data from those detected signals that correspond to object-detection signals may be arranged (e.g., by the system controller 402 and/or the lidar controller 416) into a three-dimensional point cloud (albeit a point cloud having missing points corresponding to those regions that contain defects). In this way, partial detection of the surrounding environment could occur: (i) during the same emission/detection cycle as the diagnostic test of the components of the system and/or (ii) while performing a cleaning protocol using a cleaning device.

As described above, light signals (e.g., crossfeedback signals) detected during the application of one or more cleaning protocols can be used to make determinations about the qualities of one or more components of the system 700 (e.g., by tracking the status of one or more defects over time). One way of making such a determination involves tracking the intensity of such crossfeedback signals over time. For example, each time a light signal is emitted and a corresponding crossfeedback signal is detected, an intensity of the detected crossfeedback signal (e.g., a maximum intensity/peak intensity of the intensity waveform corresponding to the light signal) and a timestamp associated with the detected crossfeedback signal may be recorded (e.g., stored within a memory associated with the system controller 402 or the lidar controller 416). The light detector 426 whose detected crossfeedback signals are being captured over time may be selected based on an empirical study of which light detector 426 within an array of light detectors 426 detects the greatest intensity of crossfeedback and/or which light detectors 426 within the array of light detectors 426 detects crossfeedback which has the highest correlation to the presence of defects. Upon recording the series of timestamps and associated intensities over time (e.g., as additional puffs of pressurized air 722 are applied to the optical component 502), a plot of intensity versus time for the detected crossfeedback signals can be made. FIG. 8A illustrates such a plot.

Plot 802 represents the measured intensity (e.g., in arbitrary units) of crossfeedback signals over time (e.g., in seconds). In other embodiments, rather than simply plotting the intensities of one crossfeedback signal corresponding to one light detector as it is detected at various points in time, an average of crossfeedback intensities can be recorded at a series of times. For example, any crossfeedback signal that is detected within a set time period (e.g., having length 1 μs, 5 μs, 10 μs, 20 μs, and 50 μs) may be grouped together with other crossfeedback signals within that time period and the intensities of the crossfeedback signals in that time period may be averaged and stored with an associated timestamp. Then the plot of these averaged intensities versus time may be generated. Such a plot may appear similar to FIG. 8A (e.g., including a plot 802 that represents average intensity, in arb. units, over time, in seconds).

Once a plot 802 of intensity versus time (or averaged intensities versus time) is generated, that plot 802 may be fitted to a curve (e.g., an exponential curve, a quadratic curve, a logarithmic curve, and a linear curve). For example, as illustrated in FIG. 8A, the plot 802 may be fitted to curve 804. Using various values from the equation for the fitted curve, various features of the underlying system can be evaluated. For example, as illustrated in FIG. 8A, the fitted curve 804 may have an equation of the following form:

$$f(t) = A_0 e^{-t/\tau} + A_{final}$$

where $f(t)$ is the intensity value at time t, $A_0+A_{final}$ is the initial value of the curve 804 at time t=0 (i.e., a peak value), $A_{final}$ is the final value of the curve 804 as $t\to\infty$, and $\tau$ is the time constant associated with the exponential decay.

Because the curve 804 correlates to the time-evolution of one or more defects over time, each of the values $A_0$, $A_{final}$, and t may provide information that can be used to assess the qualities of the component in question (e.g., the hydrophobicity of the hydrophobic coating) and/or of the cleaning device. For example, in the case of a hydrophobic coating under test, $A_0$ may relate to the ability of the hydrophobic coating to cause water/cleaning solution on the hydrophobic coating to reject large water droplets from forming on and/or adhering to the hydrophobic coating, while t may relate to the ability of the hydrophobic coating to shed drops off of the hydrophobic coating. Additionally or alternatively, if certain features are present in the fitted curve 804 (e.g., if $A_0+A_{final}$ is very high), one or more determinations could be made about the cleaning device (e.g., the cleaning device has a clog and has failed to apply a proper amount of cleaning solution 712 via a sprayer 710). The metrics extracted from the curve 804 can be compared, for example, to the same metrics that were determined during calibration measurements. For example, a calibration curve can be generated by fitting a curve to similar measurements of crossfeedback signals on an optical component (e.g., a hydrophobic coating) whose qualities (e.g., hydrophobicity) are well-characterized (e.g., a brand new hydrophobic coating whose hydrophobic properties are specified to within a fabrication tolerance or a completely degraded hydrophobic coating whose hydrophobic properties are their lowest realistic values). The values of $A_0$, $A_{final}$, and t for the calibration curve may then be stored within a memory associated with the system controller 402 or the lidar controller 416 and/or stored in a server memory that is accessible by the system controller 402/lidar controller 416 (e.g., via the Internet or other data network).

When performing the diagnostic test, the determined values of $A_0$, $A_{final}$, and t may be compared to one or more calibration values of $A_0$, $A_{final}$, and t in order to determine the qualities of the optical component 502. For example, the determined values of $A_0$, $A_{final}$, and t may be compared to calibration values of $A_0$, $A_{final}$, and t that were recorded for an ideal optical component (e.g., a brand new optical component). If one or more of the determined values of $A_0$, $A_{final}$, and $\tau$ is more than a threshold difference from the calibration values of $A_0$, $A_{final}$, and t for the ideal optical component (e.g., more than 1% different, more than 5% different, more than 10% different, more than 15% different, more than 20% different, and more than 25% different), then it may be determined that one or more qualities of the optical component is deficient (e.g., the hydrophobicity of the hydrophobic coating has degraded over time).

In addition to or instead of simply comparing the determined values of $A_0$, $A_{final}$, and $\tau$ to threshold values, alternative metrics can be generated. For example, a single logarithmic metric can be used to determine whether the optical component under test "passes" the test or "fails" the diagnostic test:

$$\text{Pass/Fail Metric} = \log_{10}\left(\frac{\left(\frac{A_0}{A_{0\,Calibration}}\right)^{C_0}}{\left(\frac{\tau}{\tau_{Calibration}}\right)^{C_1}}\right)$$

where $A_0$ is the measured initial value at time t=0 (i.e., a peak value) minus $A_{final}$ associated with the fitted exponential decay, $A_{0\ Calibration}$ is the initial value at time t=0 (i.e., a peak value) minus $A_{final\ Calibration}$ associated with the fitted exponential decay for a prior calibration measurement (or the averages of a plurality of calibration measurements), $\tau$ is the time constant associated with the fitted exponential decay, $\tau_{Calibration}$ is the time constant associated with the fitted exponential decay for a prior calibration measurement (or the averages of a plurality of calibration measurements), and $C_0$ and $C_1$ are tunable constants that can be modified to adjust the relative importance of the values of $A_0$ and $\tau$ in determining whether an optical component under test passes or fails. Such constants may be tuned based on studies of a series of optical components (e.g., to determine which performance qualities of the optical components are most important). The value of Pass/Fail Metric may be calculated and then compared to a threshold value to determine whether the optical component passes or fails. For example, a threshold value of 0 may be used to determine whether the optical component passes or fails (e.g., with metrics greater than or equal to 0 passing and metrics less than 0 failing). If it is determined that the optical component has "failed," one or more remedial actions may be performed (e.g., applying an additional cleaning protocol or a different cleaning protocol to the optical component, replacing the optical component, flagging the optical component for repair by a technician, decommissioning the optical component or the associated lidar device, and adjusting measurements made by the lidar device to account for defects in the optical component). In some embodiments, instead of a single threshold value, there may be multiple thresholds against which the Pass/Fail Metric can be compared. For example, if the metric is greater than or equal to 1, the optical component passes; if the metric is greater than or equal to 0 and less than 1, the optical component conditionally passes (e.g., requiring some sort of remedial action); and if the metric is less than 0, the optical component fails (e.g., requiring replacement).

Figure 8A:
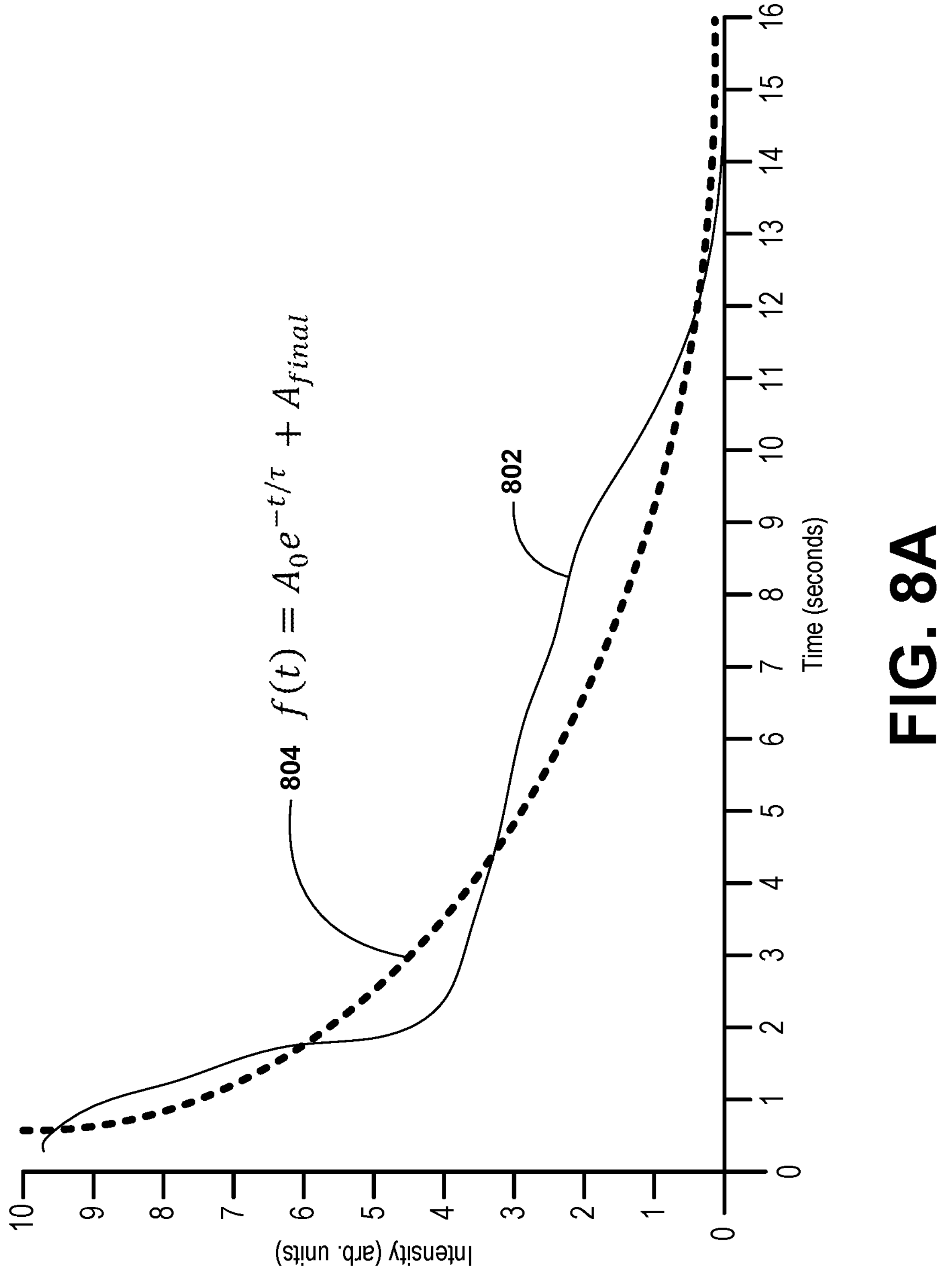
FIG. 8A is an illustration of a plot of intensities of detected reflected light signals and a fitted function associated with the plot of intensities of detected reflected light signals, according to example embodiments.

While the example fitted curve 804 illustrated in FIG. 8A corresponds to an exponential decay function, it is understood that other types of functions are also possible and are contemplated herein. For example, linear functions or quadratic functions could also be used. If a different type of function is used rather than an exponential function the figures of merit may be different, as well. For example, if a linear function is used, the slope and y-intercept may be used as figures of merit instead.

In some embodiments, adverse weather conditions may affect measurements (e.g., detected crossfeedback signals) taken during the application of a cleaning protocol. For example, if it is raining, in addition to cleaning solution 712 being applied to the optical component 502 (e.g., as illustrated in FIG. 7A), rain may also be deposited on the optical component 502. As such, there may be additional defects (e.g., additional water droplets) on the optical component 502 when conducting the crossfeedback measurements. As such, any figures of merit associated with a fitted curve (e.g., $A_0$, $A_{final}$, $\tau$, or a Pass/Fail Metric) that are determined during the rain might be different than they would otherwise be without the rain. Given this, any determinations made about the underlying optical component 502 based on these figures of merit might be unreliable. Embodiments herein provide for multiple techniques to compensate for this. For example, rather than comparing the intensity of the crossfeedback signal(s) to calibration measurements that were made in clear-weather conditions, they may instead be compared against calibration measurements that were, themselves, made during the rain (e.g., a brand new hydrophobic coating may have undergone calibration testing in the rain). Additionally or alternatively, an offset may be applied to either the detected intensities of the crossfeedback signals and/or to the metrics determined based on the detected intensities. For example, each of the crossfeedback intensities detected during the rain conditions could have its detected intensity adjusted by a fixed amount (e.g., 5%, 10%, 15%, etc. or 1 arb. unit, 2 arb. units, and 3 arb. units). Similarly, the values of $A_{final}$ or t could also be adjusted after they are determined to account for the rain. For example, the determined t could be reduced by 5%, 10%, 15%, etc. or by 1 s, 2 s, 3 s, etc.

While the example provided here is for rain, it is understood that other adverse weather conditions (e.g., snow, wind, fog, sleet, and hail) could also be addressed in a similar manner. Further, the type of adverse weather condition(s) present and/or the intensity of such weather condition (s) (e.g., rainfall/minute and wind speed) could be detected by other sensors associated with the system 700 (e.g., the radar 126 of the vehicle 100 shown and described with reference to FIG. 1) or could be transmitted to the lidar device 410 by another device (e.g., from a management server over the Internet). The intensity of such weather conditions could be used to determine the degree to which each of the intensities of the crossfeedback signals and/or the determined metrics are adjusted (e.g., rainfall/minute at a first level corresponds to a reduction by 5% whereas rainfall/minute at a second, higher level corresponds to a reduction by 10%). The degree to which the adjustments of the intensities of the crossfeedback signals and/or the determined metrics depends on weather conditions (e.g., on the amount of rainfall/minute) may be determined based on previous calibration measurements taken during a variety of weather conditions.

Techniques have been described above for fitting the intensities of the crossfeedback signals to a curve 804 and then making determinations about qualities of the underlying optical component based on figures of merit (e.g., a time constant) related to the fitted curve 804. In some embodiments, thresholds for one or more of the figures of merit may be determined using a machine-learned model. For example, a classifier may be trained using labeled training data that corresponds to crossfeedback intensity values captured during calibration experiments where the qualities of the underlying optical component were known. Alternatively, rather than plotting the intensity values and then fitting a curve to the plotted values, a machine-learned model (e.g., a classifier) could be trained using labeled training data that corresponds to the crossfeedback signals themselves (e.g., the full intensity waveforms corresponding to the crossfeedback signals intensity variation over time) when the qualities of the underlying optical component is known. Then, when performing a diagnostic test, a series of detected crossfeedback signals (e.g., full intensity waveforms) could be fed into the machine-learning model to determine qualities of the underlying optical component.

While FIG. 8A depicts the analysis of crossfeedback signals detected during the cleaning protocol in order to assess the health of the optical component 502, it is understood that this is provided solely as an example and that other signals could additionally or alternatively be detected and analyzed. For example, crosstalk signals (as shown and described above with reference to FIG. 6B) could be detected and/or images (as shown and described above with reference to FIG. 6D) could be captured. Those crosstalk signals and/or images could also be analyzed to determine figures of merit regarding the condition of the optical component 502. Further, still other signals could be detected/analyzed. For example, internal reflections of light signals emitted by the light emitters 424 may be detected by the light detectors 426 and analyzed (e.g., even if those light signals do not represent crossfeedback signals, i.e., if the light signals were emitted/detected by light emitters 424/light detectors 426, respectively, in the same channel of the lidar device 410).

The figures of merit determined by analyzing the crossfeedback signals during a cleaning protocol (e.g., $A_0$, $A_{final}$, $\tau$, or Pass/Fail Metric) may be used to characterize an entire fleet, as well. For example, FIG. 8B is a scatterplot of a number of optical components 812 across a fleet. For example, each of the optical components 812 may represent a hydrophobic coating on a lidar device 410 of a different vehicle within a fleet of vehicles. As illustrated in FIG. 8B, each optical component 812 may have been analyzed using the process above to determine a $A_0$ value and a t value (e.g., and the results transmitted to a single device, such as to a fleet management server). Based on these values, each of the optical components 812 has been placed on the scatterplot. Further, because it depends on $A_0$ and $\tau$, a curve 814 indicating the location of the Pass/Fail Metric has been placed on the scatterplot of FIG. 8B. Any optical components 812 on the curve or lying above and to the left of the curve 814, for example, may correspond to optical components that 812 "pass" under the Pass/Fail Metric, whereas any optical components 812 lying below and to the right of the curve 814 may correspond to optical components 812 that "fail" under the Pass/Fail Metric. Such a scatterplot could be stored within a memory (e.g., of a fleet management server) for later access/review.

Figure 8B:
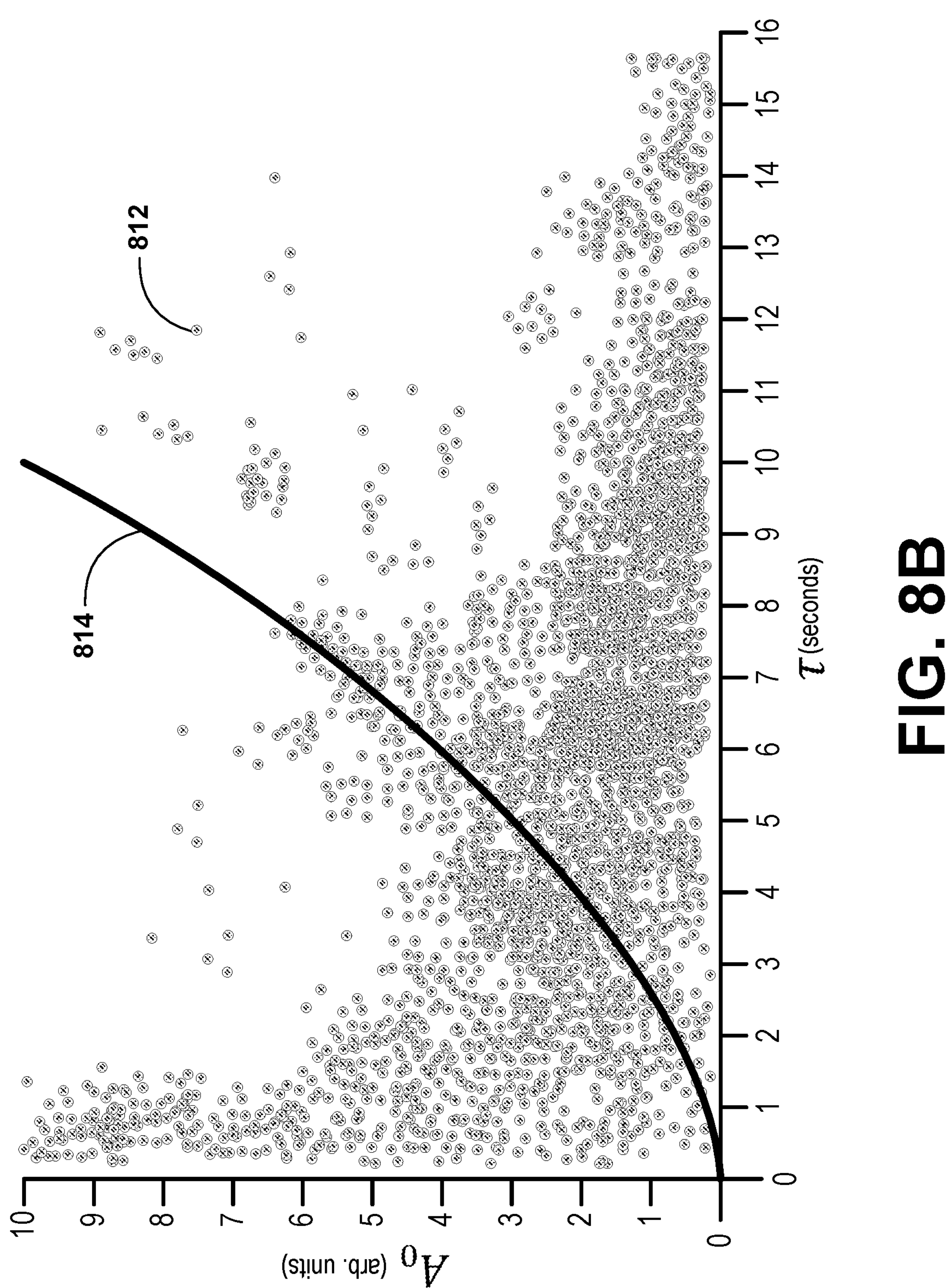
FIG. 8B is a scatterplot of metrics determined for a fleet of systems, according to example embodiments.

By reviewing the scatterplot of FIG. 8B, the overall health of the optical components 812 across the fleet may be assessed. For example, if a large number of the optical components 812 fall into the "fail" category under the Pass/Fail Metric, it may be determined that a different type of optical component 812 (e.g., a different type of hydrophobic coating) should replace the one currently being employed in the fleet. Additionally or alternatively, if different types of optical components 812 (e.g., different types of hydrophobic coatings) are being employed across the fleet, the relative performance of the different types of optical components 812 can be compared to determine if one type is superior to another. The scatterplot of FIG. 8B could also be used to set threshold values. For example, if it is determined that 80% of the fleet of optical components 812 should correspond to "passes" under the Pass/Fail Metric, a review of the scatterplot of FIG. 8B could assist in determining where to place the curve 814 dividing "passes" and "failures."

While the illustration in FIG. 8B is provided for a fleet of optical components 812, it is also understood that a similar plot could be generated for a single optical component at various points in time. For example, a single optical component may be analyzed at various points in time to determine the corresponding $A_0$ values and $\tau$ values at each point in time. Thereafter, each of the combinations of $A_0$ and $\tau$ for the various points in time could be plotted on a scatterplot. By reviewing such a scatterplot, an analysis of the figures of merit of the optical component over time can be made. Further, while only two figures of merit are plotted in FIG. 8B, it is understood that other scatterplots (e.g., three-dimensional and n-dimensional) scatterplots could also be used to track more than two figures of merit. Additionally or alternatively, more than one curve (or plane in the case of three-dimensional or n-dimensional scatterplots) dividing "passes" and "failures" may be employed (e.g., in cases where there are multiple thresholds being considered).

Figure 9:
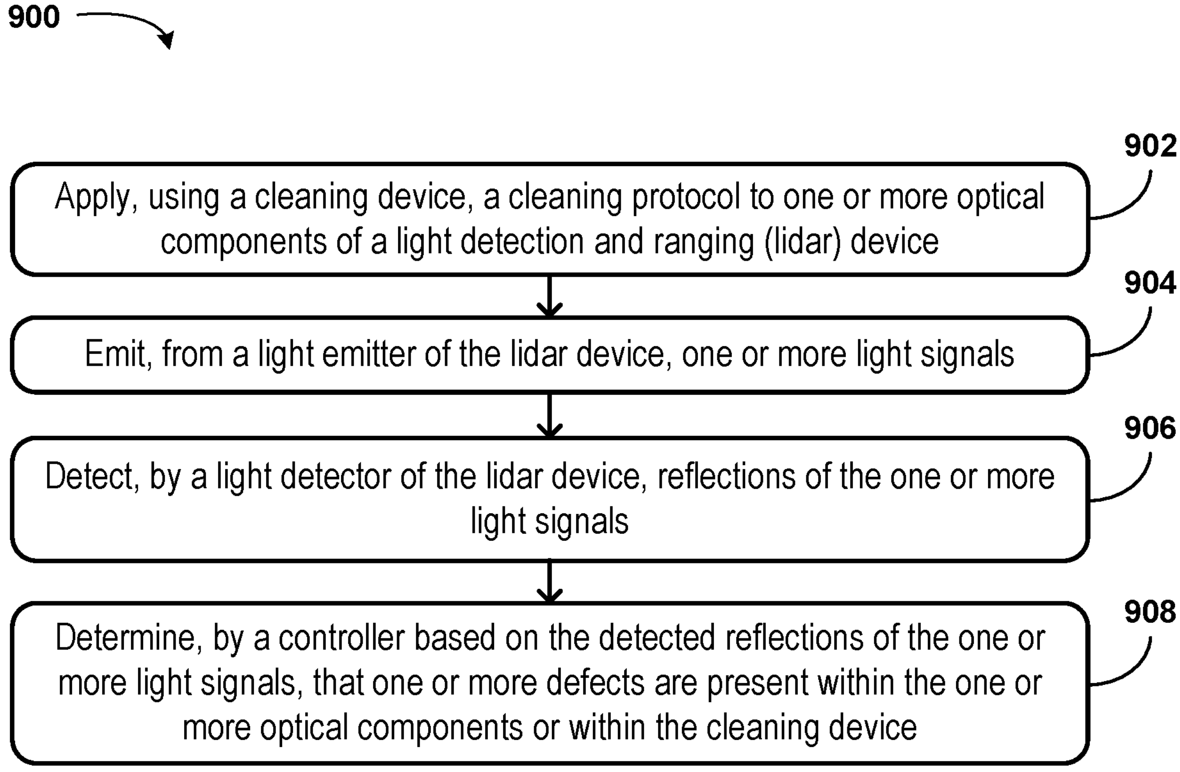
FIG. 9 is a flowchart illustration of a method, according to example embodiments.

FIG. 9 is a flowchart diagram of a method 900, according to example embodiments. In some embodiments, the method 900 may be performed by a system (e.g., the system 700 illustrated in FIGS. 7A and 7B). The method 900 may be performed at regular intervals (e.g., once an hour, once every six hours, once every twelve hours, once a day, and once a week), upon startup (e.g., upon the lidar device 410 beginning use for object detection and avoidance or upon the a vehicle that includes the lidar device 410 leaving a depot), in response to a request from a user (e.g., transmitted via a mobile application), in response to one or more optical components being determined to possibly possess defects (e.g., based on data previously detected by the one or more optical components), etc.

At block 902, the method 900 may include applying, using a cleaning device, a cleaning protocol to one or more optical components of a lidar device.

At block 904, the method 900 may include emitting, from a light emitter of the lidar device, one or more light signals.

At block 906, the method 900 may include detecting, by a light detector of the lidar device, reflections of the one or more light signals.

At block 908, the method 900 may include determining, by a controller based on the detected reflections of the one or more light signals, that one or more defects are present within the one or more components or within the cleaning device.

In some embodiments of the method 900, block 902 may include spraying, from a sprayer of the cleaning device, a cleaning solution onto at least one of the one or more optical components. Block 902 may also include applying, by a pressurized air supply of the cleaning device, pressurized air onto the at least one optical component.

In some embodiments of the method 900, the one or more defects may include a degradation of a hydrophobic coating. The degradation may correspond to a reduced hydrophobicity of the hydrophobic coating.

In some embodiments of the method 900, block 904 may include emitting a series of light signals. Further, block 906 may include detecting a series of reflections of the one or more light signals.

In some embodiments of the method 900, block 908 may include generating a plot of intensities of the series of reflections of the one or more light signals over time and fitting the generated plot to a function.

In some embodiments of the method 900, block 908 may include comparing the function to which the generated plot is fitted with a calibration function generated during a calibration of the lidar device.

In some embodiments of the method 900, the function to which the generated plot is fitted may include an exponential function. Further, a peak value and a time constant of the exponential function may represent figures of merit.

In some embodiments of the method 900, block 908 may include accounting for a weather condition in a surrounding environment of the lidar device. Further, in some embodiments, accounting for a weather condition in the surrounding environment of the lidar device may include applying one or more offsets to the plot of intensities based on the weather condition.

In some embodiments, the method 900 may also include performing remedial action based on the determined one or more defects present.

In some embodiments of the method 900, block 902 may include spraying, from a sprayer of the cleaning device, a cleaning solution onto at least one of the one or more optical components. Block 902 may also include wiping, by a wiper of the cleaning device, the at least one optical component to remove the cleaning solution.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including RAM, a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
- applying, using a cleaning device, a cleaning protocol to one or more optical components of a light detection and ranging (lidar) device;
- emitting, from a light emitter of the lidar device, a series of light signals;
- detecting, by a light detector of the lidar device, a series of reflections of the light signals; and
- determining, by a controller based on the series of detected reflections, that one or more defects are present within the one or more optical components or within the cleaning device, wherein determining that one or more defects are present within the one or more optical components or within the cleaning device comprises:
  - generating a plot of intensities of the series of detected reflections of the light signals over time; and
  - fitting the generated plot to a function.

2. The method of claim 1, wherein applying the cleaning protocol comprises:
- spraying, from a sprayer of the cleaning device, a cleaning solution onto at least one of the one or more optical components; and
- applying, by a pressurized air supply of the cleaning device, pressurized air onto the one or more optical components.

3. The method of claim 1, wherein the one or more defects comprise a degradation of a hydrophobic coating, and wherein the degradation corresponds to a reduced hydrophobicity of the hydrophobic coating.

4. The method of claim 1, wherein emitting the series of light signals comprises emitting the series of light signals during the application of the cleaning protocol, and wherein detecting the series of reflections of the light signals comprises detecting the series of reflections during the application of the cleaning protocol.

5. The method of claim 1, wherein determining that one or more defects are present within the one or more optical components or within the cleaning device further comprises extracting a metric from the fitted plot.

6. The method of claim 1, wherein determining that one or more defects are present within the one or more optical components or within the cleaning device further comprises comparing the function to which the generated plot is fitted with a calibration function generated during a calibration of the lidar device.

7. The method of claim 1, wherein the function to which the generated plot is fitted comprises an exponential function, and wherein a peak value and a time constant of the exponential function represent figures of merit.

8. The method of claim 1, wherein determining that one or more defects are present within the one or more optical components or within the cleaning device comprises accounting for a weather condition in a surrounding environment of the lidar device.

9. The method of claim 8, wherein accounting for the weather condition in the surrounding environment of the lidar device comprises applying one or more offsets to the plot of intensities based on the weather condition.

10. The method of claim 1, further comprising performing remedial action based on the determined one or more defects present.

11. The method of claim 1, wherein applying the cleaning protocol comprises:

spraying, from a sprayer of the cleaning device, a cleaning solution onto at least one of the one or more optical components; and wiping, by a wiper of the cleaning device, the one or more optical components to remove the cleaning solution.

12. A system comprising:

a light detection and ranging (lidar) device comprising:

one or more optical components;

a light emitter configured to emit a series of light signals; and a light detector configured to detect a series of reflections of the light signals;

a cleaning device configured to apply a cleaning protocol to the one or more optical components; and a controller configured to determine, based on the series of detected reflections, that one or more defects are present within the one or more optical components or within the cleaning device, wherein determining that one or more defects are present within the one or more optical components or within the cleaning device comprises:

generating a plot of intensities of the series of detected reflections of the light signals over time; and fitting the generated plot to a function.

13. The system of claim 12, wherein the cleaning device comprises a sprayer and a pressurized air supply, and wherein applying the cleaning protocol comprises:

spraying, from a sprayer of the cleaning device, a cleaning solution onto at least one of the one or more optical components; and applying, by a pressurized air supply of the cleaning device, pressurized air onto the one or more optical components.

14. The system of claim 12, wherein the one or more defects comprise a degradation of a hydrophobic coating, and wherein the degradation corresponds to a reduced hydrophobicity of the hydrophobic coating.

15. The system of claim 12, wherein the light emitter is configured to emit the series of light signals during the application of the cleaning protocol by the cleaning device, and wherein the light detector is configured to detect the series of reflections of the light signals during the application of the cleaning protocol by the cleaning device.

16. The system of claim 12, wherein determining that one or more defects are present within the one or more optical components or within the cleaning device further comprises extracting a metric from the fitted plot.

17. The system of claim 12, wherein determining that one or more defects are present within the one or more optical components or within the cleaning device further comprises comparing the function to which the generated plot is fitted with a calibration function generated during a calibration of the lidar device.

18. The system of claim 12, wherein the function to which the generated plot is fitted comprises an exponential function, and wherein a peak value and a time constant of the exponential function represent figures of merit.

19. The system of claim 12, wherein determining that one or more defects are present within the one or more optical components or within the cleaning device comprises accounting for a weather condition in a surrounding environment of the lidar device.

20. A computing device configured to:

receive data corresponding to a series of reflections of light signals detected by a light detector of a light detection and ranging (lidar) device, wherein the series of light signals were emitted by a light emitter of the lidar device in response to a cleaning device applying a cleaning protocol to one or more optical components of the lidar device; and determine, based on the received data, that one or more defects are present within the one or more optical components or within the cleaning device, wherein determining that one or more defects are present within the one or more optical components or within the cleaning device comprises:

generating a plot of intensities of the series of detected reflections of the light signals over time; and fitting the generated plot to a function.

* * * * *